United States Patent
Mimura et al.

(10) Patent No.: US 10,427,686 B2
(45) Date of Patent: Oct. 1, 2019

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Yoshitaka Mimura, Wako (JP); Naotaka Kumakiri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 111 days.

(21) Appl. No.: 15/460,859

(22) Filed: Mar. 16, 2017

(65) Prior Publication Data

US 2017/0267238 A1 Sep. 21, 2017

(30) Foreign Application Priority Data

Mar. 16, 2016 (JP) .................................. 2016-052980

(51) Int. Cl.
*B60W 30/182* (2012.01)
*B60W 10/04* (2006.01)
(Continued)

(52) U.S. Cl.
CPC .......... *B60W 30/182* (2013.01); *B60W 10/04* (2013.01); *B60W 10/20* (2013.01);
(Continued)

(58) Field of Classification Search
CPC .... B60W 30/182; B60W 10/00; B60W 10/04; B60W 10/18; B60W 10/20; B60W 50/14;
(Continued)

(56) References Cited

U.S. PATENT DOCUMENTS 6,226,570 B1 * 5/2001 Hahn ................... B60K 28/066
701/1
2008/0027636 A1 * 1/2008 Tengler .............. G01C 21/3484
701/425
(Continued)

FOREIGN PATENT DOCUMENTS

JP 2010-949 A 1/2010
JP 2013-156927 A 8/2013
(Continued)

OTHER PUBLICATIONS

Office Action dated Aug. 15, 2017, issued in counterpart Japanese Application No. 2016-052980, with English translation (10 pages).
(Continued)

*Primary Examiner* — Thomas G Black
*Assistant Examiner* — Sara J Lewandroski
(74) *Attorney, Agent, or Firm* — Westerman, Hattori, Daniels & Adrian, LLP

(57) ABSTRACT

A vehicle control system includes: an automated driving controller that automatically controls at least one out of acceleration/deceleration or steering of a vehicle, and that performs automated driving control in one of a plurality of modes having different levels of automated driving; and a informing section that, in cases in which the automated driving mode transitions to one of the plurality of modes in accordance with a travel environment of the vehicle, predicts a timing at which the mode will transition, and informs the predicted timing.

7 Claims, 15 Drawing Sheets

(51) Int. Cl.
  *B60W 10/20* (2006.01)
  *G05D 1/00* (2006.01)
  *B60W 50/14* (2012.01)
  *B60W 50/00* (2006.01)
  *B60W 50/08* (2012.01)
  *B60W 30/16* (2012.01)

(52) U.S. Cl.
  CPC ........ *B60W 30/16* (2013.01); *B60W 50/0097* (2013.01); *B60W 50/082* (2013.01); *B60W 50/14* (2013.01); *G05D 1/0061* (2013.01); *G05D 1/0088* (2013.01); *B60W 2050/007* (2013.01); *B60W 2050/146* (2013.01); *B60W 2400/00* (2013.01); *B60W 2540/00* (2013.01); *B60W 2550/20* (2013.01); *B60W 2550/402* (2013.01); *B60W 2710/20* (2013.01); *B60W 2720/106* (2013.01); *G05D 2201/0213* (2013.01)

(58) Field of Classification Search
  CPC ........ B60W 50/0097; B60W 50/0098; B60W 2050/143; B60W 2050/146; B60W 2050/0062; B60W 2050/007; B60W 2050/0071; B60W 2050/0072; B60W 2050/0073; B60W 2050/0074; B60W 2050/0075; B60W 2050/0077; B60W 2050/0078; B60W 2050/009; B60W 2050/0095; B60W 2050/0096; G05D 1/0088
  See application file for complete search history.

(56) References Cited

U.S. PATENT DOCUMENTS

| | | | |
|---|---|---|---|
| 2009/0299598 A1* | 12/2009 | Boecker | B60W 30/16 701/96 |
| 2015/0353088 A1* | 12/2015 | Ishikawa | G05D 1/0061 701/23 |
| 2016/0085301 A1* | 3/2016 | Lopez | G06F 3/013 345/156 |
| 2016/0280234 A1* | 9/2016 | Reilhac | B60K 35/00 |
| 2017/0371334 A1* | 12/2017 | Nagy | B60W 50/14 |

FOREIGN PATENT DOCUMENTS

| | | |
|---|---|---|
| JP | 2015-17944 A | 1/2015 |
| JP | 2015-182624 A | 10/2015 |
| JP | 2015-230573 A | 12/2015 |
| WO | 2015/162764 A1 | 10/2015 |

OTHER PUBLICATIONS

Office Action dated Jan. 29, 2019, issued in counterpart Japanese Application No. 2016-52980 (6 pages).
Office Action dated Jul. 9, 2019, issued in counterpart JP Application No. 2016-52980, with English translation. (8 Pages).

* cited by examiner

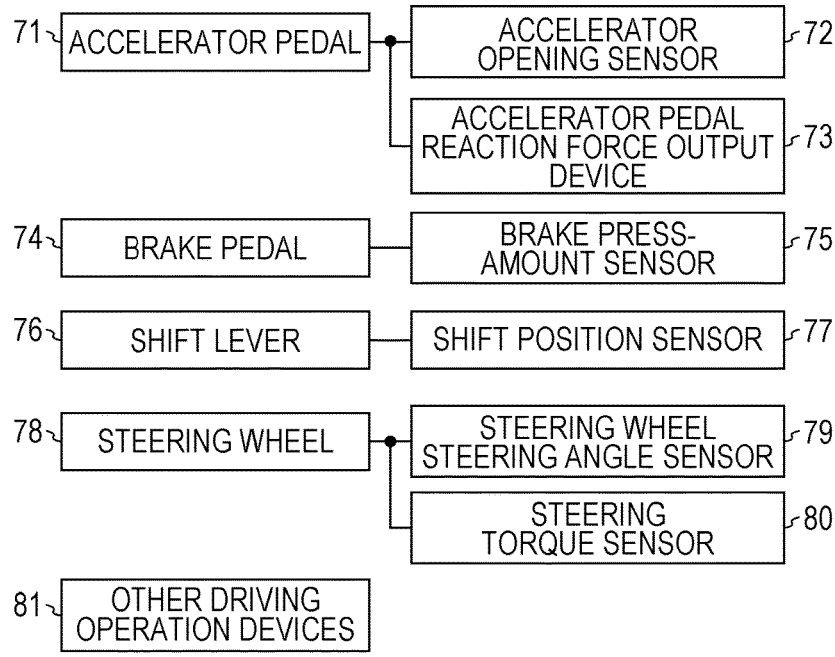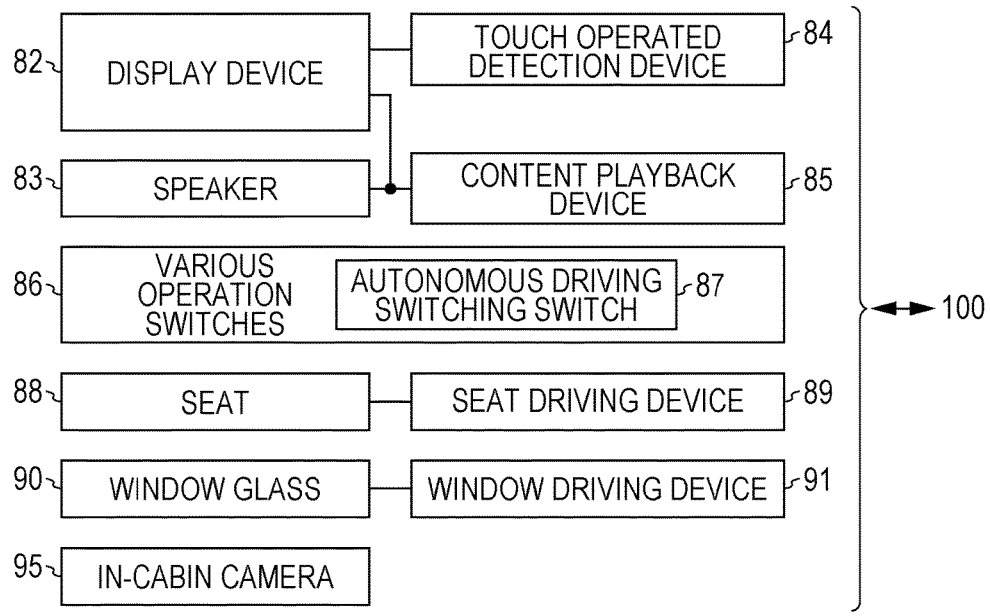
FIG. 3

FIG. 14

| DRIVING MODE | MANUAL DRIVING MODE | AUTONOMOUS DRIVING MODE | | | ... |
| --- | --- | --- | --- | --- | --- |
| NON-DRIVING OPERATION SYSTEM | | FIRST MODE | SECOND MODE | THIRD MODE | |
| NAVIGATION OPERATIONS | PROHIBITED | PERMITTED | PERMITTED | PROHIBITED | ... |
| CONTENT PLAYBACK OPERATIONS | PROHIBITED | PERMITTED | PROHIBITED | PROHIBITED | ... |
| INSTRUMENT PANEL OPERATIONS | PROHIBITED | PERMITTED | PERMITTED | PERMITTED | ... |
| ... | ... | ... | ... | ... | ... |

VEHICLE CONTROL SYSTEM, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-052980, filed Mar. 16, 2016, entitled "Vehicle Control System, Vehicle Control Method, and Vehicle Control Program." The contents of this application are incorporated herein by reference in their entirety.

BACKGROUND

1. Field

The present disclosure relates to a vehicle control system, a vehicle control method, and a vehicle control program.

2. Description of the Related Art

Recently, research is progressing into technology for automatically controlling at least one out of acceleration/deceleration or steering of a vehicle such that the vehicle travels along a route to a destination (referred to as "automated driving" hereafter). In relation thereto, an information display device is known that determines an automated driving level based on a system state of an autonomously driven vehicle, and that is provided with a display control unit that simultaneously displays on a display unit an image of an operation section of the vehicle and an image of a portion of the operation section to be operated by a person, in accordance with the automated driving level (for example, see Japanese Unexamined Patent Application Publication No. 2015-182624).

However, in the related technology, switching to each driving mode in automated driving has been performed automatically at timings established by preset switching conditions, such that it was possible for conditions to arise such as conditions in which preparations have not been made at the vehicle occupant side.

SUMMARY

The present disclosure describes a vehicle control system, a vehicle control method, and a vehicle control program capable of causing a vehicle occupant to make efficient use of time by causing the vehicle occupant to recognize a timing of a switch in automated driving.

A first aspect of the present disclosure describes a vehicle control system including: an automated driving controller that automatically controls at least one out of acceleration/deceleration or steering of a vehicle, and that performs automated driving control in one of plural modes having different levels of automated driving; and a informing section that, in cases in which the automated driving mode transitions to one of the plural modes in accordance with a travel environment of the vehicle, predicts a timing at which the mode will transition, and informs a driver of the predicted timing to alert the driver to that timing.

A second aspect of the present disclosure describes the vehicle control system according to the first aspect, wherein configuration may be made such that the informing section predicts a continuation time until the level of the automated driving transitions from a high state to a low state.

A third aspect of the present disclosure describes the vehicle control system according to the first aspect, wherein configuration may be made such that the informing section informs a predicted continuation time until a timing at which a change will be made from the current automated driving mode of the vehicle to an automated driving mode with a high level of automated driving.

A fourth aspect of the present disclosure describes the vehicle control system according to the first aspect, wherein configuration may be made such that the informing section starts informing the timing at which the mode will transition at a start timing of a mode preceding change to an automated driving mode with a high level of automated driving.

A fifth aspect of the present disclosure describes the vehicle control system according to the first aspect, wherein configuration may be made such that the informing section starts informing the timing at which the mode will transition at a timing at which change was made from an automated driving mode with a high level of automated driving to an automated driving mode with a low level of automated driving.

A sixth aspect of the present disclosure describes the vehicle control system according to the first aspect, wherein configuration may be made such that the informing section informs a predicted continuation time of a congestion following travel mode for automated driving to follow a vehicle in front at a specific speed or below.

A seventh aspect of the present disclosure describes the vehicle control system according to the third aspect, wherein configuration may be made such that: the informing section includes a predicted continuation time computation section that computes the predicted continuation time based on the current position of the vehicle and traffic information related to a route to a destination the vehicle is travelling to; and the informing section informs the predicted continuation time computed by the predicted continuation time computation section.

An eighth aspect of the present disclosure describes the vehicle control system according to the seventh aspect, wherein configuration may be made such that the predicted continuation time computation section computes the predicted continuation time at specific time intervals.

A ninth aspect of the present disclosure describes the vehicle control system according to the seventh aspect, wherein configuration may be made such that the predicted continuation time computation section computes a distance on a route of travel by the vehicle based on the current position of the vehicle and a position at which the congestion is predicted to clear obtained from the traffic information, and computes a first time based on the computed distance and the vehicle speed of the vehicle; computes a second time until a specific speed is reached by acceleration of the vehicle at a specific acceleration from the position at which the congestion is predicted to clear obtained from the traffic information; and computes the predicted continuation time based on the computed first and second times.

A tenth aspect of the present disclosure describes the vehicle control system according to the first aspect, wherein the vehicle control system may further include: a line of sight detector that detects a line of sight direction of an occupant inside the vehicle; and wherein the informing section informs the timing at which the mode will transition to an interface device present in the line of sight direction of the occupant of the vehicle detected by the line of sight detection section.

An eleventh aspect of the present disclosure describes a vehicle control method performed by an onboard computer, the vehicle control method including: automatically controlling at least one out of acceleration/deceleration or steering of a vehicle, performing automated driving control in one of plural modes having different levels of automated driving; and in cases in which the automated driving mode transitions to one of the plural modes in accordance with a travel environment of the vehicle, predicting a timing at which the mode will transition, and causing a informing section to inform the predicted timing.

A twelfth of the present disclosure describes a vehicle control program that causes an onboard computer to execute processing, the processing including: automatically controlling at least one out of acceleration/deceleration or steering of a vehicle, performing automated driving control in one of plural modes having different levels of automated driving; and in cases in which the automated driving mode transitions to one of the plural modes in accordance with a travel environment of the vehicle, predicting a timing at which the mode will transition, and causing a informing section to inform the predicted timing.

According to the present disclosure described by the first aspect, the second aspect, the sixth aspect, the eleventh aspect, and the twelfth aspect, the occupant of the vehicle can make more efficient use of their time due to informing the timing at which the automated driving mode will transition to one of the plural modes is made in accordance with the travel environment of the vehicle.

According to the present disclosure described by the third aspect, the occupant of the vehicle can be caused to recognize the switch timing of automated driving due to informing the information indicating the predicted continuation time until the timing at which a change will be made to an automated driving mode with a high level of automated driving. This enables the occupant to use their time more efficiently.

According to the present disclosure described by the fourth aspect and the fifth aspect, the occupant can more reliably ascertain for how long a state with a low level of automated driving will continue.

According to the present disclosure described by the seventh aspect, the predicted continuation time can be output with higher precision based on the traffic information related to the route that the vehicle is to travel until the destination.

According to the present disclosure described by the eighth aspect, an up-to-date predicted continuation time of the mode can be output in accordance with changes to the traffic conditions and the like.

According to the present disclosure described by the ninth aspect, a more accurate predicted continuation time can be computed by taking the first time and the second time into consideration.

According to the present disclosure described by the tenth aspect, the occupant can be more reliably caused to recognize output information. The word "section" used in this application may mean a physical part or component of computer hardware or any device including a controller, a processor, a memory, etc., which is particularly configured to perform functions and steps disclosed in the application.

BRIEF DESCRIPTION OF THE DRAWINGS

FIG. 3 is a configuration diagram of an HMI.
FIG. 14 is a diagram illustrating an example of per-mode operation permission information.

DESCRIPTION OF THE PREFERRED EMBODIMENTS

Figure 1:
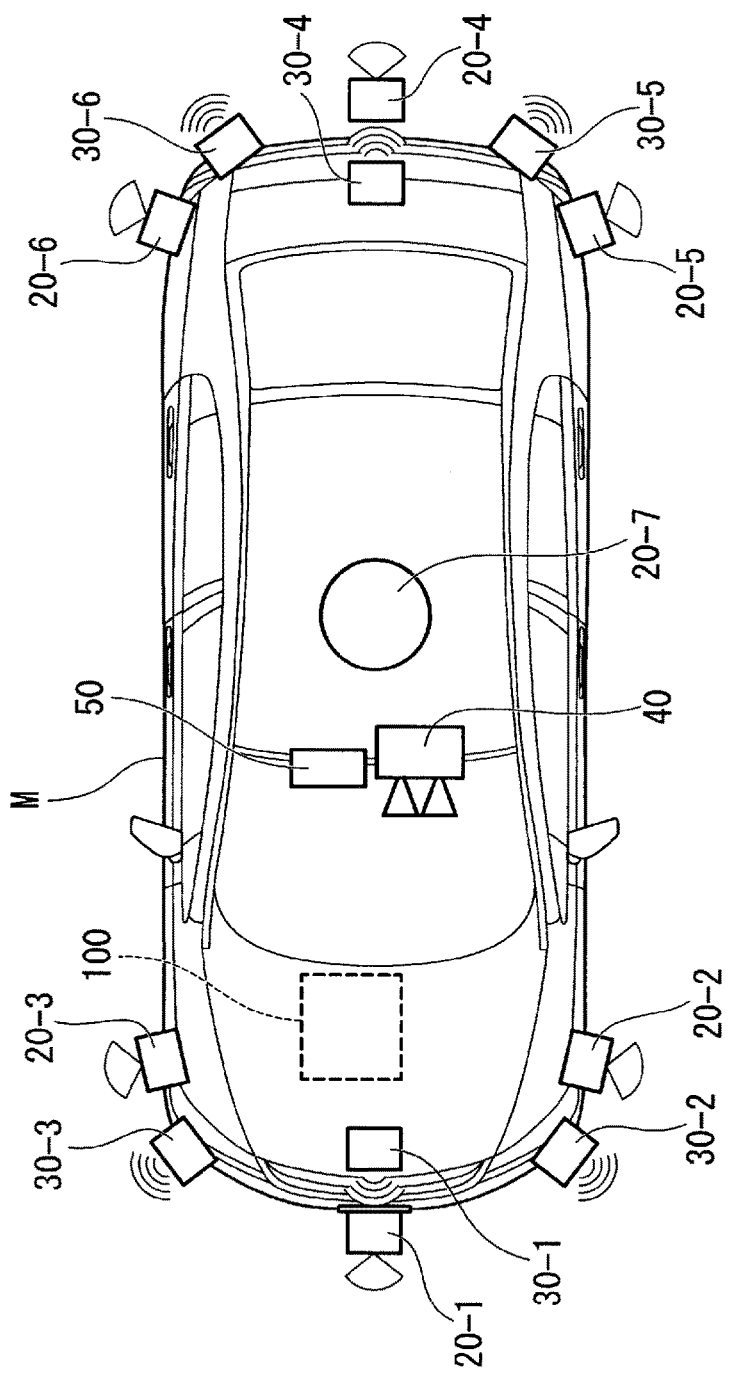
FIG. 1 is a diagram illustrating configuration elements of a vehicle installed with a vehicle control system of an embodiment.

Explanation follows regarding embodiments of a vehicle control system, a vehicle control method, and a vehicle control program of the present disclosure, with reference to the drawings.
Common Configuration
FIG. 1 is a diagram illustrating configuration elements of a vehicle (referred to as the vehicle M hereafter) installed with a vehicle control system 100 of the present embodiment. The vehicle installed with the vehicle control system 100 is, for example, a two-wheeled, three-wheeled, or four-wheeled automobile, and this includes automobiles that use an internal combustion engine such as a diesel engine or a gasoline engine as a power source, electric automobiles that have an electrical motor as a power source, hybrid automobiles that have both an internal combustion engine and an electrical motor, and the like. The electric automobile is, for example, driven using electric power discharged from a battery such as a secondary battery, a hydrogen fuel cell, a metal fuel cell, or an alcohol fuel cell.

As illustrated in FIG. 1, sensors such as finders 20-1 to 20-7, radars 30-1 to 30-6, and a camera (imaging section) 940, a navigation device (display section) 50, and the vehicle control system 100 are installed to the vehicle M.

The finders 20-1 to 20-7, for example, measure light scatter from emitted light, and are LIDARs (light detection and ranging, or laser imaging detection and ranging) that measure a distance to a target. For example, the finder 20-1 is attached to a front grill or the like, and the finder 20-2 and the finder 20-3 are attached to a vehicle body side face, a door mirror, a front headlamp interior, a side lamp vicinity, or the like. The finder 20-4 is attached to a trunk lid or the like, the finder 20-5 and the finder 20-6 are attached to a vehicle body side face, a tail light interior, or the like. The finders 20-1 to 20-6 described above have detection regions of, for example, approximately 150° relative to a horizontal direction. The finder 20-7 is attached to a roof or the like. The finder 20-7 has a detection region of, for example, 360° relative to the horizontal direction.

The radar 30-1 and the radar 30-4 are, for example, long-range millimeter wave radars having a wider detection region in the depth direction than the other radars. The radars 30-2, 30-3, 30-5, 30-6 are intermediate-range millimeter wave radars having a narrower detection region in the depth direction than the radars 30-1 and 30-4.

Hereafter, the finders 20-1 to 20-7 are simply referred as "finders 20" in cases in which no particular distinction is made, and the radars 30-1 to 30-6 are simply referred to as "radars 30" in cases in which no particular distinction is made. The radars 30, for example, detect objects using a frequency modulated continuous wave (FM-CW) method.

The camera 40 is, for example, a digital camera that employs a solid state imaging element such as a charge coupled device (CCD) or complementary metal oxide semiconductor (CMOS). The camera 40 is attached to a front windshield upper portion, a back face of a rear-view mirror, or the like. The camera 40, for example, periodically and repeatedly images ahead of the vehicle M. The camera 40 may be a stereo camera that includes plural cameras.

Note that the configuration illustrated in FIG. 1 is merely an example; a portion of the configuration may be omitted, and other configuration may be further added.

Figure 2:
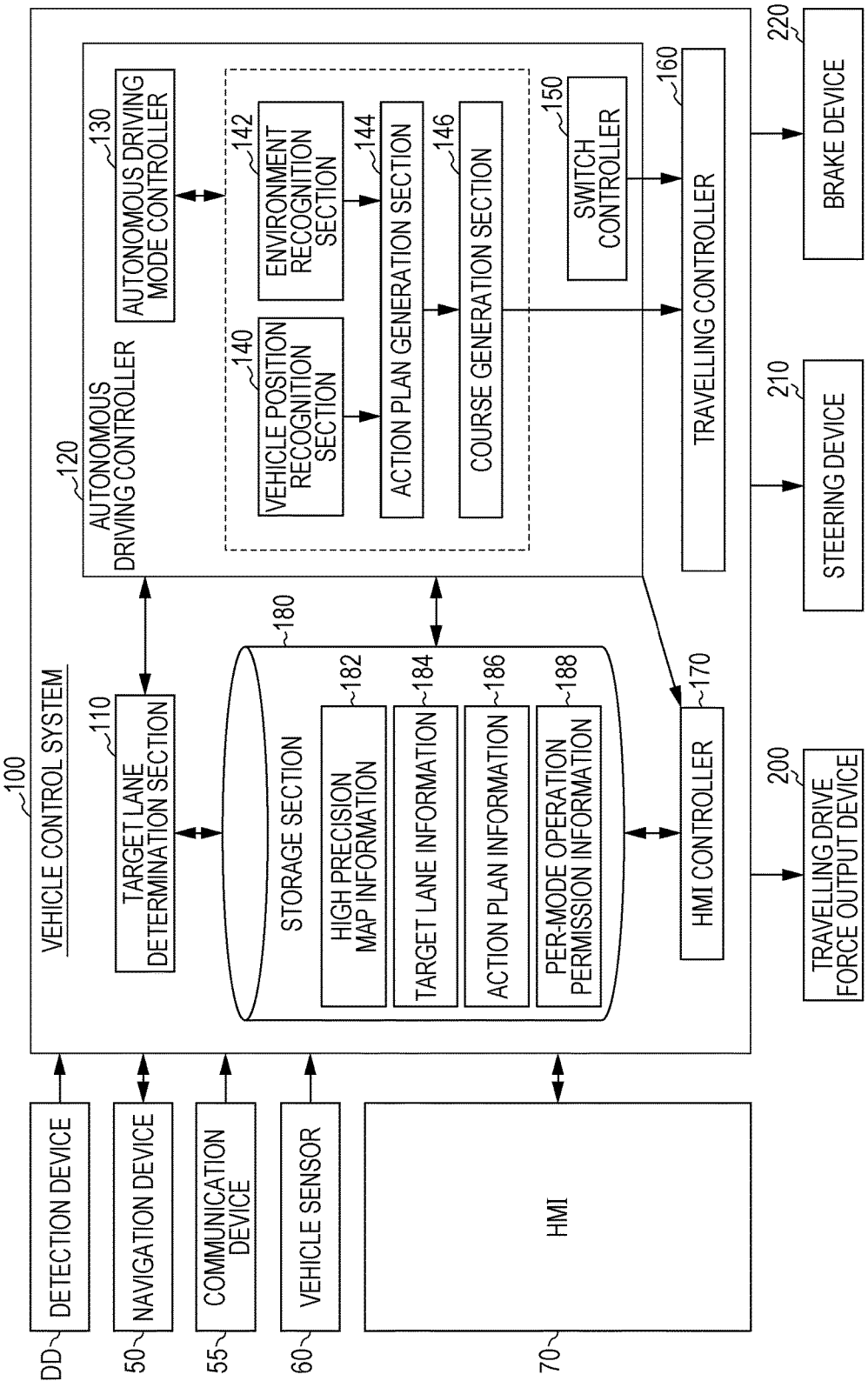
FIG. 2 is a functional configuration diagram centered on a vehicle control system.

FIG. 2 is a functional configuration diagram centered on the vehicle control system 100. Detection devices DD that include the finders 20, the radars 30, the camera 40, and the like, the navigation device 50, a communication device 55, a vehicle sensor 60, a human machine interface (HMI) 70, the vehicle control system 100, a travel drive output device 200, a steering device 210, and a brake device 220 are installed in the vehicle M. These devices and apparatuses are connected to one another by a multi-communication line such as a controller area network (CAN) communication line, or by a wireless communication network, a serial communication line, or the like. Note that the vehicle control system in the scope of the claims may encompass configuration (such as the detection devices DD and the HMI 70) other than that of the vehicle control system 100, and does not merely represent "the vehicle control system 100".

The navigation device 50 includes a global navigation satellite system (GNSS) receiver, map information (a navigation map), a touch panel display device that functions as a user interface, a speaker, a microphone, and the like. The navigation device 50 infers the position of the vehicle M using the GNSS receiver and derives a route from that position to a destination designated by the user. The route derived by the navigation device 50 is provided to a target lane determination section 110 of the vehicle control system 100. The position of the vehicle M may be inferred or complemented by an inertial navigation system (INS) employing output from the vehicle sensor 60. When the vehicle control system 100 is executing a manual driving mode, the navigation device 50 provides guidance along a route to the destination using audio and a navigation display. Note that configuration for inferring the position of the vehicle M may be provided independently from the navigation device 50. Moreover, the navigation device 50 may, for example, be implemented by functionality of a terminal device such as a smartphone or a tablet terminal possessed by the user. In such cases, information is exchanged between the terminal device and the vehicle control system 100 using wireless or wired communication.

The communication device 55, for example, performs wireless communication using a cellular network, a Wi-Fi network, Bluetooth (registered trademark), dedicated short range communication) DSRC, or the like. The communication device 55 can, for example, acquire traffic information (such as congestion information), weather information, and the like from an external device connected by wireless communication.

The vehicle sensor 60 includes a vehicle speed sensor that detects the vehicle speed (travel speed), an acceleration sensor that detects acceleration, a yaw rate sensor that detects angular speed of rotation about a vertical axis, a heading sensor that detects the heading of the vehicle M, and the like.

FIG. 3 is a configuration diagram of the HMI 70. The HMI 70 is provided with, for example, driving operation system configuration, and non-driving operation system configuration. There is no clear boundary between the two, and driving operation system configuration may provide non-driving operation system functionality (and vise-versa). The driving operation system is an example of an operation reception section that receives operations by a vehicle occupant (the occupant) of the vehicle M. Moreover, the non-driving operation system includes an interface device.

As configuration of the driving operation system, the HMI 70 includes, for example, an accelerator pedal 71, an accelerator opening sensor 72 and an accelerator pedal reaction force output device 73, a brake pedal 74 and a brake press-amount sensor (or a master pressure sensor or the like) 75, a shift lever 76 and a shift position sensor 77, a steering wheel 78, a steering angle sensor 79 and a steering torque sensor 80, and other driving operation devices 81.

The accelerator pedal 71 is an operation element for receiving acceleration instructions (or deceleration instructions when reverse-operated) from the vehicle occupant. The accelerator opening sensor 72 detects a press-amount of the accelerator pedal 71, and outputs an accelerator opening signal indicating the press-amount to the vehicle control system 100. Note that output may be made directly to the travel drive output device 200, the steering device 210, or the brake device 220 instead of outputting to the vehicle control system 100. Similar applies for other configuration of the driving operation system explained below. The accelerator pedal reaction force output device 73, for example, outputs force (an operation reaction force) to the accelerator pedal 71 against the operation direction, according to instructions from the vehicle control system 100.

The brake pedal 74 is an operation element for receiving deceleration instructions from the vehicle occupant. The brake press-amount sensor 75 detects the amount of pressing (or the force pressing) on the brake pedal 74 and outputs a brake signal indicating the detection result to the vehicle control system 100.

The shift lever 76 is an operation element for receiving shift level change instructions from the vehicle occupant. The shift position sensor 77 detects the shift level instruction by the vehicle occupant and outputs a shift position signal indicating the detection result to the vehicle control system 100.

The steering wheel 78 is an operation element for receiving turning instructions from the vehicle occupant. The steering angle sensor 79 detects the operation angle of the steering wheel 78 and outputs a steering angle signal indicating the detection result to the vehicle control system 100. The steering torque sensor 80 detects the torque placed on the steering wheel 78 and outputs a steering torque signal indicating the detection result to the vehicle control system 100. Note that control related to the steering wheel 78 may, for example, be output of an operation reaction force to the steering wheel 78 by torque output on the steering shaft by a reaction force motor or the like.

The other driving operation devices 81 are, for example, a joystick, a button, a dial switch, a graphic user interface (GUI) switch, and the like. The other driving operation devices 81 receive acceleration instructions, deceleration instructions, turning instructions, and the like, and output the instructions to the vehicle control system 100.

As configuration of the non-driving operation system, the HMI 70 includes, for example, a display device (display section) 82, a speaker 83, a touch-operated detection device 84 and a content playback device 85, various operation switches 86, a seat 88 and a seat driving device 89, window glass 90 and a window driving device 91, and an in-cabin camera (imaging section) 95.

The display device 82 is, for example, respective sections of an instrument panel, such as a liquid crystal display (LCD) or an organic electro luminescence (EL) display device attached to, for example, freely selected locations facing the passenger seat and rear seat. Moreover, the display device 82 may be a head-up display (HUD) that projects an image onto the front windshield or another window. The speaker 83 outputs audio. In cases in which the display device 82 is a touch panel, the touch-operated detection device 84 detects contact positions (touched positions) on the display screen of the display device 82 and outputs the contact positions to the vehicle control system 100. Note that in cases in which the display device 82 is not a touch panel, the touch-operated detection device 84 may be omitted.

The content playback device 85 includes, for example, a digital versatile disc (DVD) playback device, a compact disc (CD) playback device, a television receiver, various guidance image generation devices, and the like. Some or all of the display device 82, the speaker 83, the touch-operated detection device 84, and the content playback device 85 may be configuration shared with the navigation device 50. The display device 82, the speaker 83, the content playback device 85, and the navigation device 50 described above are each an example of an interface device, but there no limitations to these devices.

The various operation switches 86 are disposed at freely selected places inside the vehicle cabin. The various operation switches 86 include an automated driving switching switch 87 for instructing automated driving to start (or to start in the future) or stop. The automated driving switching switch 87 may be a graphical user interface (GUI) switch, or a mechanical switch. Moreover, the various operation switches 86 may include a switch for driving the seat driving device 89 or window driving device 91.

The seat 88 is a seat in which the vehicle occupant sits. The seat driving device 89 freely drives the reclining angle, front-rear direction position, yaw angle, and the like of the seat 88. The window glass 90 is, for example, provided to each door. The window driving device 91 drives opening and closing of the window glass 90.

The in-cabin camera 95 is a digital camera that employs a solid state imaging element such as a CCD or CMOS. The in-cabin camera 95 is attached to a position from which at least the head (face included) of the vehicle occupant performing driving operation can be imagined, such as the rearview mirror, steering wheel boss section, or instrument panel. The in-cabin camera 95, for example, images the vehicle occupant periodically and repeatedly.

Prior to explaining the vehicle control system 100, explanation follows regarding the travel drive output device 200, the steering device 210, and the brake device 220.

The travel drive output device 200 outputs travelling drive force (torque) to drive wheels for causing the vehicle to travel. In cases in which the vehicle M is an automobile that has an internal combustion engine as the power source, the travel drive output device 200 includes, for example, an engine, a transmission, and an engine electronic control unit (ECU) that controls the engine. In cases in which the vehicle M is an electric automobile that has an electrical motor as the power source, the travel drive output device 200 includes, for example, a travel motor and a motor ECU that controls the travel motor. In cases in which the vehicle M is a hybrid automobile, the travel drive output device 200 includes, for example, an engine, a transmission, and an engine ECU, and a travel motor and travelling motor ECU. In cases in which the travel drive output device 200 includes only an engine, the engine ECU adjusts the engine throttle opening, the shift level, or the like, in accordance with information input from a travelling controller 160, described later. In cases in which the travel drive output device 200 includes only a travel motor, the motor ECU adjusts a duty ratio of a PWM signal applied to the travel motor, in accordance with information input from the travelling controller 160. In cases in which the travel drive output device 200 includes an engine and a travel motor, the engine ECU and the motor ECU cooperatively control travelling drive force, in accordance with information input from the travelling controller 160.

The steering device 210 includes, for example, a steering ECU and an electric motor. The electric motor, for example, exerts force on a rack and pinion mechanism to change the orientation of the steering wheel. The steering ECU drives the electric motor in accordance with information input from the vehicle control system 100, or input information regarding the steering angle or steering torque, and changes the orientation of the steering wheel.

The brake device 220 is, for example, an electric servo brake device including a brake caliper, a cylinder that transmits hydraulic pressure to the brake caliper, an electric motor that causes the cylinder to generate hydraulic pressure, and a brake controller. The brake controller of the electric servo brake device controls an electric motor in accordance with information input from the travelling controller 160, such that braking torque is output to each wheel in accordance with the braking operation. The electric servo brake device may include a mechanism that transmits hydraulic pressure generated due to operation of the brake pedal to the cylinder via a master cylinder as backup. Note that the brake device 220 is not limited to the electric servo brake device explained above, and may be an electrically controlled hydraulic brake device. The electrically controlled hydraulic brake device controls an actuator in accordance with information input from the travelling controller 160, and transmits hydraulic pressure of a master cylinder to the cylinder. The brake device 220 may also include a regenerative brake for the travel motor that can be included in the travel drive output device 200.

Vehicle Control System

Explanation follows regarding the vehicle control system 100. The vehicle control system 100 is, for example, implemented by one or more processors, or by hardware having equivalent functionality. The vehicle control system 100 may be configured by a combination of a processor such as a central processing unit (CPU), a storage device, and an ECU (electronic control unit) in which a communication interface is connected by an internal bus, or an microprocessing unit (MPU) or the like.

Returning to FIG. 2, the vehicle control system 100 includes, for example, the target lane determination section 110, an automated driving controller 120, the travelling controller 160, an HMI controller 170, and the storage section 180. The automated driving controller 120 includes, for example, an automated driving mode controller 130, a vehicle position recognition section 140, an environment recognition section 142, an action plan generation section 144, a course generation section 146, and a switch controller 150. Some or all out of the target lane determination section 110, the respective sections of the automated driving controller 120, and the travelling controller 160 are implemented by the processor executing a program (software). Moreover, of these, some or all may be implemented by hardware such as a large scale integration (LSI) or an application specific integrated circuit (ASIC), or may be implemented by a combination of software and hardware.

The storage section 180 stores information such as high precision map information 182, target lane information 184, action plan information 186, and per-mode operation permission information 188. The storage section 180 is implemented by read only memory (ROM), random access memory (RAM), a hard disk drive (HDD), flash memory, or the like. The program executed by the processor may be pre-stored in the storage section 180, or may be downloaded from an external device via an onboard internet setup or the like. Moreover, the program may be installed in the storage section 180 by loading a portable storage medium storing the program into a drive device, not illustrated in the drawings. Moreover, a computer (onboard computer) of the vehicle control system 100 may be distributed across plural computer devices.

The target lane determination section 110 is, for example, implemented by an MPU. The target lane determination section 110 divides the route provided from the navigation device 50 into plural blocks (for example, divides the route every 100 m along the vehicle advance direction), and references the high precision map information 182 to determine the target lane for each block. The target lane determination section 110, for example, determines which lane number from the left to travel on. In cases in which a branch point, a merge point, or the like is present in the route, the target lane determination section 110, for example, determines a target lane so as to enable the vehicle M to travel along a sensible travel route for advancing beyond the branch. The target lane determined by the target lane determination section 110 is stored in the storage section 180 as the target lane information 184.

The high precision map information 182 is map information with higher precision than the navigation map of the navigation device 50. The high precision map information 182 includes, for example, lane-center information, lane-boundary information, or the like. Moreover, the high precision map information 182 may include, for example, road information, traffic restriction information, address information (address, zip code, or position information (longitude, latitude, etc.)) facilities information, phone number information, and the like. The road information includes information such as information indicating whether the type of road is an expressway, a toll road, a national highway, or a prefectural road, the number of lanes in the road, the width of each lane, the gradient of the road, the position of the road (three dimensional coordinates including a longitude, a latitude, and an altitude), the curvature of the lanes, the position of lane merge and branch points, and signage provided on the road. The traffic restriction information includes information regarding lane closures due to road work, traffic accidents, congestion, and the like. The high precision map information 182 may acquire up-to-date information from an external device or the like via the communication device 55 either periodically or irregularly, and may store this information in the storage section 180.

The automated driving controller 120 automatically controls at least one out of the acceleration/deceleration or the steering of the vehicle M, such that the vehicle M travels along the route to the destination. Moreover, the automated driving controller 120 performs automated driving control in any of plural modes with different levels of automated driving. Note that the plural modes may, for example, correspond to plural modes that demand different degrees of surroundings monitoring by the occupant of the vehicle M, or may correspond to plural different modes of operation permission levels for the interface devices of the HMI 70 that receive operations by the vehicle occupant and outputs information.

The automated driving mode controller 130 determines the automated driving mode to be implemented by the automated driving controller 120. The automated driving mode in the present embodiment includes the following modes. Note that the following modes are merely examples and the number of modes and content of the modes of the automated driving may be freely determined.

First Mode

The first mode is the mode in which the level of automated driving is highest in comparison to the other modes. In cases in which the first mode is being implemented, all vehicle controls, such as complex merging control, are performed automatically, such that the vehicle occupant does not need to monitor the surroundings or state of the vehicle M (the degree of the responsibility to monitor the surroundings is reduced compared to the other modes).

Here, a congestion following mode (low speed following mode) that follows the vehicle in front during congestion serves as an example of the first mode. In the first mode, for example, safe automated driving can be implemented by following the vehicle in front on a crowded expressway, like in Traffic Jam Pilot (TJP), and TJP mode can be ended when a position where the congestion is predicted to clear is reached. Moreover, although the first mode sometimes switches to another mode at the timing when the TJP mode is ended, the first mode may switch a specific time interval after the TJP has ended. Note that the first mode is a mode in which the operation permission level of each interface device (non-driving operation system) of the HMI 70 is highest compared to the other modes. The vehicle occupant can operate the interface devices permitted to be used in the first mode (such as the navigation device 50 and the display device 82), and, for example, can view various contents such as a DVD movie or a television program.

Second Mode

The second mode is a mode of the next highest level of automated driving after the first mode. Although in principle all vehicle control is performed automatically in cases in which the second mode is implemented, the driving operation of the vehicle M is entrusted to the vehicle occupant depending on the situation. The vehicle occupant therefore needs to monitor the surroundings and state of the vehicle M (the degree of the driver's responsibility to monitor the surroundings is increased compared with the first mode). Note that the second mode is a mode having a lower permission level for operating the various interface devices (non-driving operation system) of the HMI 70 than the first mode.

Third Mode

The third mode is a mode having the next highest level of automated driving after the second mode. In cases in which the third mode is implemented, the vehicle occupant needs to perform confirmation operations on the HMI 70 depending on the situation. The third mode, for example, notifies the timing for a lane change to the vehicle occupant, and automatically makes the lane change in cases in which the vehicle occupant has performed an operation on the HMI 70 instructing a lane change. The vehicle occupant therefore needs to monitor the surroundings and state of the vehicle M (the degree of the driver's responsibility to monitor the surroundings is increased compared with the second mode). Note that the third mode is a mode having a lower permission level for operation of each of the interface devices (the non-driving operation system) of the HMI 70 than the second mode.

The automated driving mode controller 130 determines the automated driving mode (driving mode) based on operation on the HMI 70 by the vehicle occupant, events determined by the action plan generation section 144, travelling states determined by the course generation section 146, and the like. Note that the driving modes may include a manual driving mode. The determined automated driving mode (mode information) is notified to the HMI controller 170. Moreover, a limit that depends on the performance of the detection devices DD of the vehicle M or the like may be set on the automated driving mode. For example, configuration may be such that the first mode is not implemented in cases in which the performance of the detection devices DD is low.

Switching to the manual driving mode (override) by operating the configuration of the driving operation system in the HMI 70 is possible for all of the automated driving modes. Override starts, for example, in cases in which operation on the driving operation system of the HMI 70 by the vehicle occupant of the vehicle M continues for a specific time interval or more, in cases of a specific amount or greater of change in an operation (for example, the accelerator opening of the accelerator pedal 71, the brake press-amount of the brake pedal 74, or the steering angle of the steering wheel 78), or in cases in which a specific number or greater of operations have been performed on the driving operation system.

The vehicle position recognition section 140 of the automated driving controller 120 recognizes the lane in which the vehicle M is travelling (the travel lane) and the position of the vehicle M relative to the travel lane, based on the high precision map information 182 stored in the storage section 180, and the information input from the finders 20, the radar 30, the camera 40, the navigation device 50, or the vehicle sensor 60.

The vehicle position recognition section 140, for example, recognizes the travel lane by comparing a road demarcation line pattern recognized from the high precision map information 182 (for example, an array or solid lines or dashed lines) against a road demarcation line pattern of the surroundings of the vehicle M recognized from the images imaged using the camera 40. In the recognition, the position of the vehicle M acquired from the navigation device 50, or the processing result by the INS, may be taken into account.

Figure 4:
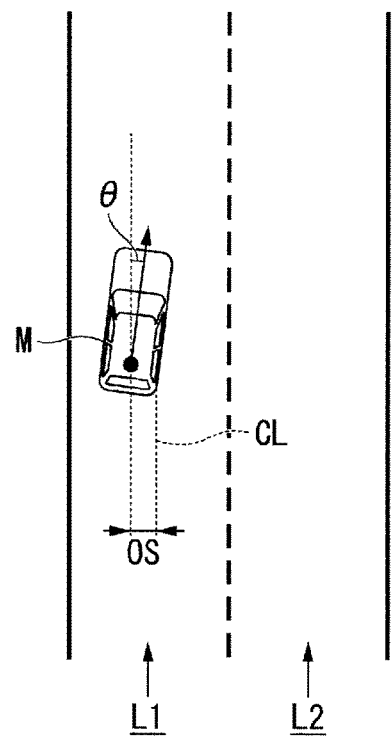
FIG. 4 is a diagram illustrating a state in which the position of a vehicle M relative to a travel lane is recognized by the vehicle position recognition section.

FIG. 4 is a diagram illustrating a state in which the relative position of the vehicle M with respect to a travel lane L1 is recognized by the vehicle position recognition section 140. The vehicle position recognition section 140 recognizes an offset OS between a reference point (for example, the center of mass) of the vehicle M and a travel lane center CL, and recognizes an angle θ formed between the advance direction of the vehicle M and a line aligned with the travel lane center CL as the relative position of the vehicle M with respect to the travel lane L1. Note that, alternatively, the vehicle position recognition section 140 may recognize the position of the reference point of the vehicle M or the like with respect to either of the side end portions of the lane L1 itself as the relative position of the vehicle M with respect to the travel lane. The relative position of the vehicle M recognized by the vehicle position recognition section 140 is provided to the action plan generation section 144.

The environment recognition section 142 recognizes the position, speed, and acceleration states of surrounding vehicles based on the information input from the finders 20, the radars 30, the camera 40, and the like. Surrounding vehicles are, for example, vehicles that are travelling in the surroundings of the vehicle M and that are travelling in the same direction as the vehicle M. The positions of the surrounding vehicles may be presented as representative points such as centers of mass or corners of other vehicles, or may be represented as regions represented by the wheels of the other vehicles. The "state" of a surrounding vehicle may include whether or not the surrounding vehicle is accelerating or changing lanes (or whether or not the surrounding vehicle is attempting to change lanes), as ascertained based on the information of the various apparatuses described above. Moreover, the environment recognition section 142 may recognize the position of a guard rail, a utility pole, a parked vehicle, a pedestrian, and other objects, in addition to the surrounding vehicles.

The action plan generation section 144 sets a starting point of automated driving and/or a destination of automated driving. The starting point of automated driving may be the current position of the vehicle M, or may be a point set by operation to instruct automated driving. The action plan generation section 144 generates an action plan in the segments between the starting point and the destination of automated driving. Note that there is no limitation thereto, and the action plan generation section 144 may generate an action plan for freely selected segments.

The action plan is, for example, composed of plural events to be sequentially executed. The events include, for example, a deceleration event that decelerates the vehicle M, an acceleration event that accelerates the vehicle M, a lane-keep event that causes the vehicle M to travel without departing from the travel lane, a lane-change event that causes the travel lane to change, an overtake event that causes the vehicle M to overtake the vehicle in front, a branch event that causes a lane change to the desired lane at a branch point or causes the vehicle M to travel so as not to depart from the current travel lane, a merge event that causes the vehicle M to accelerate or decelerate in a merging lane for merging with a main lane and changes the travel lane, and a handover event that causes a transition from manual driving mode to automated driving mode at a start point of automated driving or causes a transition from automated driving mode to manual driving mode at a point where automated driving is expected to end. The action plan generation section 144 sets a lane-change event, a branch event, or a merge event at places where the target lane determined by the target lane determination section 110 switches. Information indicating the action plan generated by the action plan generation section 144 is stored in the storage section 180 as the action plan information 186.

Figure 5:
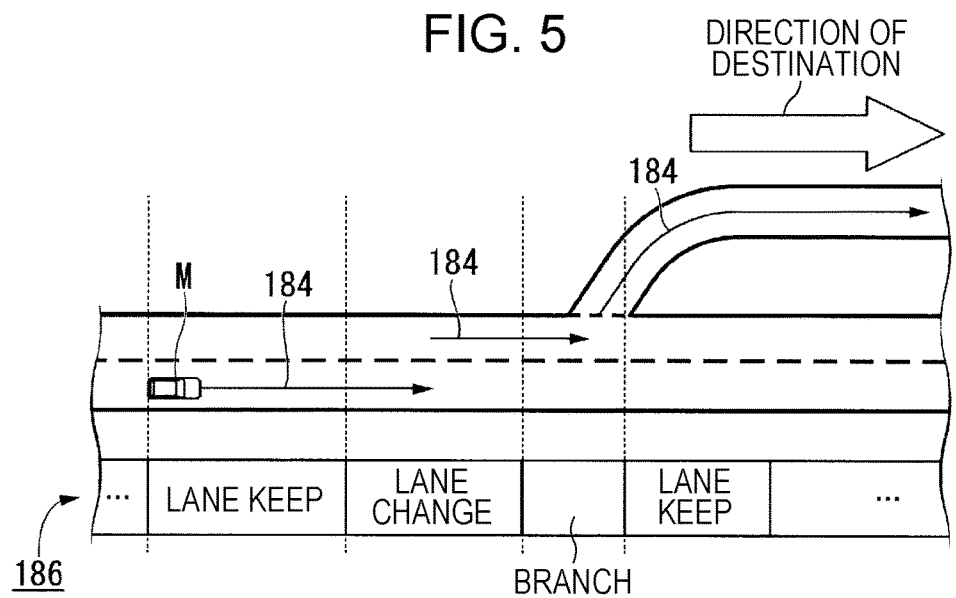
FIG. 5 is a diagram illustrating an example of an action plan generated for a given section.

FIG. 5 is a diagram illustrating an example of the action plan generated for a given segment. As illustrated in FIG. 5, the action plan generation section 144 generates the action plan needed for the vehicle M to travel on the target lane indicated by the target lane information 184. Note that the action plan generation section 144 may dynamically change the action plan irrespective of the target lane information 184, in accordance with changes to the conditions of the vehicle M. For example, in cases in which the speed of a surrounding vehicle recognized by the environment recognition section 142 during vehicle travel exceeds a threshold value, or the movement direction of a surrounding vehicle travelling in a lane adjacent to the vehicle-itself lane is toward the vehicle-itself lane direction, the action plan generation section 144 changes the event set in the driving segment that the vehicle M was expected to travel. For example, in cases in which an event is set such that a lane-change event is to be executed after a lane-keep event, when it has been determined by the recognition result of the environment recognition section 142 that a vehicle is advancing at a speed of the threshold value or greater from the rear of the lane change target lane during the lane-keep event, the action plan generation section 144 may change the event following the lane-keep event from a lane-change event to a deceleration event, a lane-keep event, or the like. As a result, the vehicle control system 100 can cause the vehicle M to autonomously travel safely even in cases in which a change occurs to the state of the environment.

Figure 6:
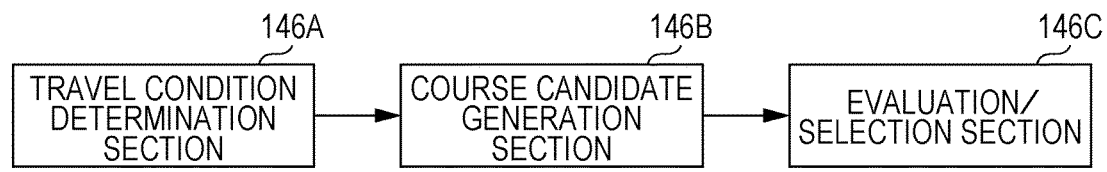
FIG. 6 is a diagram illustrating an example of a configuration of a course generation section.

FIG. 6 is a diagram illustrating an example of the configuration of the course generation section 146. The course generation section 146 includes, for example, a travel condition determination section 146A, a course candidate generation section 146B, and an evaluation/selection section 146C.

When implementing a lane-keep event, the travel condition determination section 146A, for example, determines a travel condition from out of fixed speed travel, following-travel, low speed following-travel, deceleration travel, curved travel, obstacle avoidance travel, or the like. For example, the travel condition determination section 146A determines that the travel condition is fixed speed travel when no other vehicles are present ahead of the vehicle M. The travel condition determination section 146A determines that the travel condition is following-travel in cases such as travel following a vehicle in front. The travel condition determination section 146A determines that the travel condition is low speed following-travel in a congested situation or the like. The travel condition determination section 146A determines that the travel condition is deceleration travel in cases in which deceleration of the vehicle in front is recognized by the environment recognition section 142, and in cases in which an event for, for example, stopping or parking is implemented. The travel condition determination section 146A determines that the travel condition is curve travel in cases in which the environment recognition section 142 recognizes that the vehicle M is approaching a curve. The travel condition determination section 146A determines that the travel condition is obstacle avoidance travel in cases in which the environment recognition section 142 has recognized an obstacle in front of the vehicle M.

Figure 7:
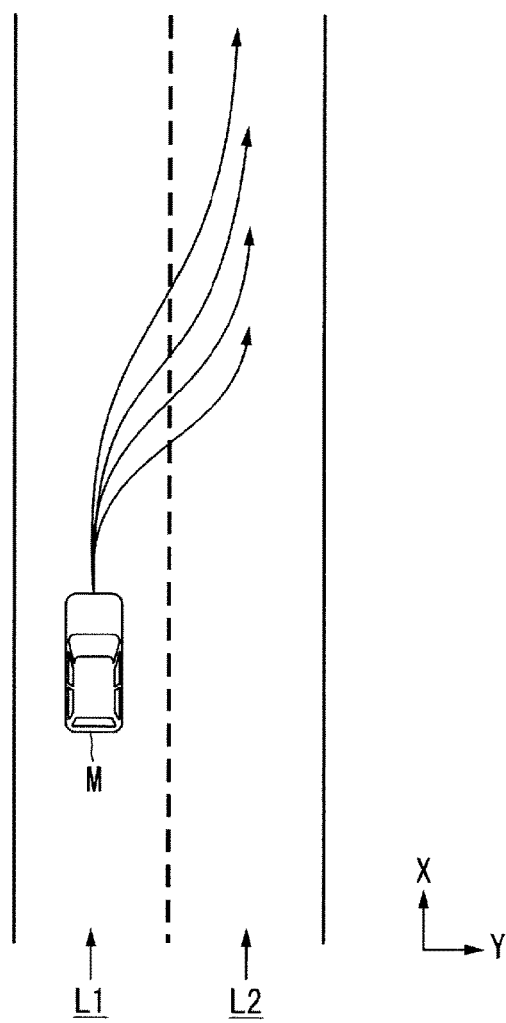
FIG. 7 is a diagram illustrating an example of candidates for a course that are generated by a course candidate generation section.

The course candidate generation section 146B generates candidates for the course based on the travel condition determined by the travel condition determination section 146A. FIG. 7 is a diagram illustrating an example of candidates for the course generated by the course candidate generation section 146B. FIG. 7 illustrates candidates for the generated course when the vehicle M changes lanes from a lane L1 to a lane L2.

Figure 8:
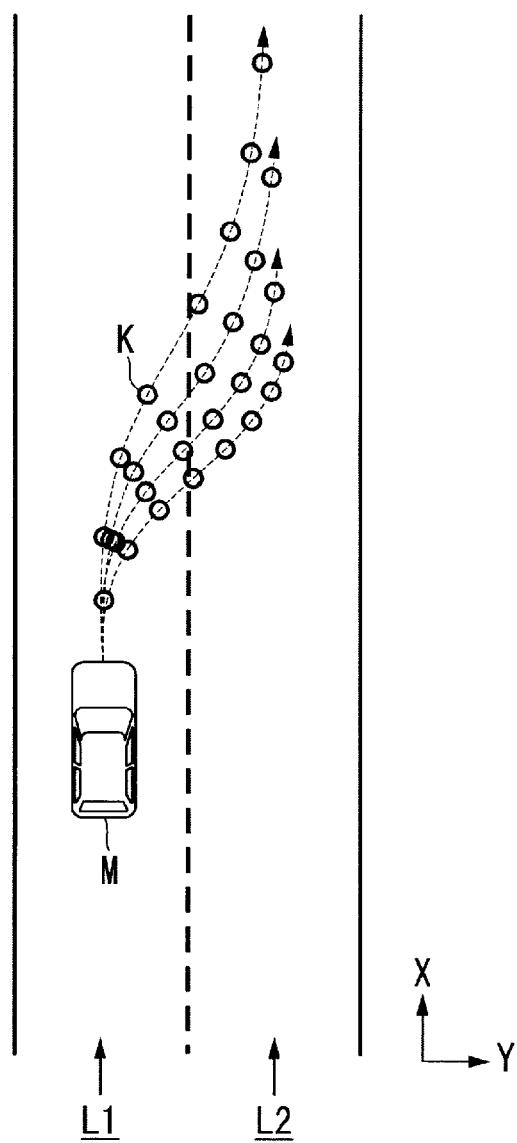
FIG. 8 is a diagram representing candidates for a course that are generated by a course candidate generation section as course points.

The course candidate generation section 146B, for example, determines courses like that illustrated in FIG. 7 as a collection of a target position (course points K) at specific time intervals in the future where the reference position (for example, the center of mass or rear wheel axle center) of the vehicle M is to arrive. FIG. 8 is a diagram illustrating candidates for the course generated by the course candidate generation section 146B, represented by course points K. The wider the separations between course points K, the faster the speed of the vehicle M, and the narrower the separations between course points K, the slower the speed of the vehicle M. Accordingly, the course candidate generation section 146B gradually widens the separations between the course points K when acceleration is desired, and gradually narrows the separations between the course points when deceleration is desired.

Thus, the course candidate generation section 146B needs to apply a target speed to each course point K since the course points K include a speed component. The target speed is determined in accordance with the travel condition determined by the travel condition determination section 146A.

Here, explanation follows regarding a determination method for the target speed when lane changing (branches included) is performed. The course candidate generation section 146B first sets a lane change target position (or a merge target position). The lane change target position is set as a position relative to surrounding vehicles, and determines "which surrounding vehicles to change lanes between". The course candidate generation section 146B observes three surrounding vehicles as references for the lane change target position, and determines a target speed when performing the lane change.

Figure 9:
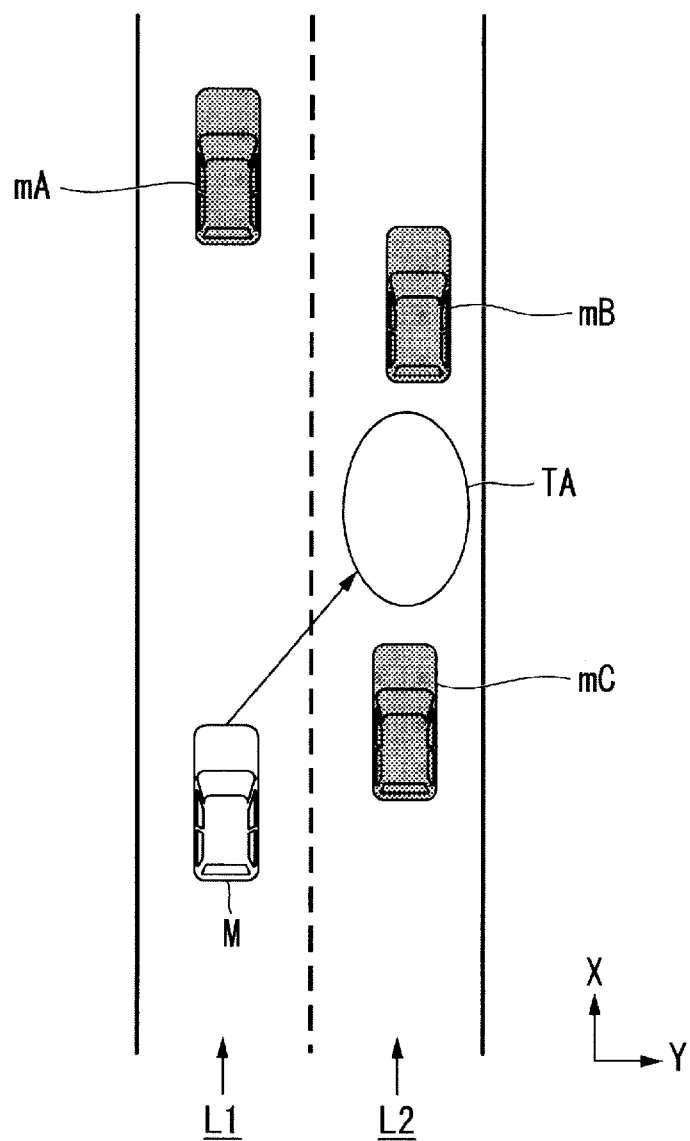
FIG. 9 is a diagram illustrating a lane change target position.

FIG. 9 is a diagram illustrating a lane change target position TA. In this figure, L1 represents the lane of the vehicle, and L2 represents an adjacent lane. Here, a vehicle in front mA is defined as a surrounding vehicle traveling directly in front of the vehicle M in the same lane as the vehicle M, a forward reference vehicle mB is defined as a surrounding vehicle travelling directly in front of the lane change target position TA, and a rear reference vehicle mC is defined as a surrounding vehicle travelling directly behind the lane change target position TA. The vehicle M needs to accelerate or decelerate to move to beside the lane change target position TA, but must avoid tailgating the vehicle in front mA at this time. The course candidate generation section 146B therefore predicts the future state of the three surrounding vehicles and determines a target speed that will not interfere with any of the surrounding vehicles.

Figure 10:
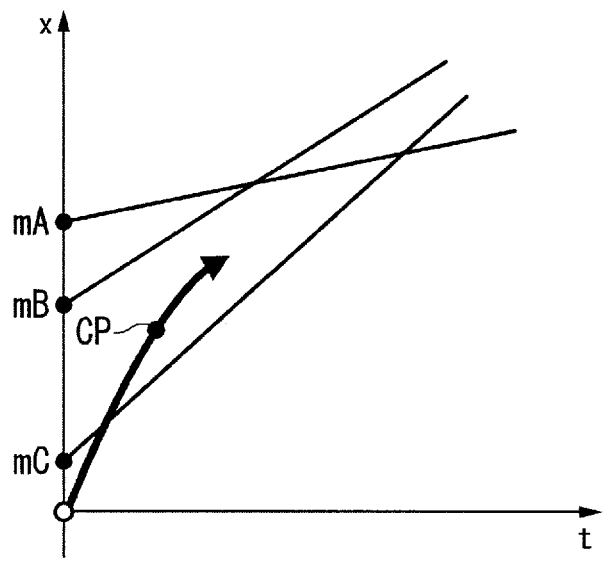
FIG. 10 is a diagram illustrating a speed generation model in a case in which it is assumed that the speeds of three surrounding vehicles are fixed.

FIG. 10 is a diagram illustrating a speed generation model when the speed of the three surrounding vehicles is assumed to be constant. In this figure, the straight lines extending from mA, mB, and mC each represent a displacement in the direction of advance when the surrounding vehicles are assumed to be travelling at respective fixed speeds. At a point CP where the lane change finishes, the vehicle M must be between the forward reference vehicle mB and the rear reference vehicle mC, and up to that point must be behind the vehicle in front mA. Under such restrictions, the course candidate generation section 146B derives plural time series patterns of target speeds up to when the lane change finishes. Then, the time series patterns of target speeds is applied to a model such as a spline curve to derive plural candidates for the course as illustrated in FIG. 7, described above. Note that the movement pattern of the three surrounding vehicles may be predicted under the assumption of constant acceleration or constant jerk (surge), irrespective of the fixed speed as illustrated in FIG. 9.

The evaluation/selection section 146C, evaluates, for example, the candidates for the course generated by the course candidate generation section 146B from the two viewpoints of plan quality and safety, and selects a course to be output to the travelling controller 160. From the viewpoint of plan quality, courses are evaluated highly in cases in which, for example, an already generated plan (for example, an action plan) is followed well and the total length of the course is short. For example, in cases in which a lane change in the rightward direction is desired, courses that temporarily changes lanes in the leftward direction and then return have a low evaluation. From the viewpoint of safety, for example, at each course point, the further the distance between the vehicle M and objects (such as surrounding vehicles) and the smaller the amount of change in acceleration/deceleration, steering angle, or the like, the higher the evaluation.

The switch controller 150 switches between the automated driving mode and the manual driving mode based on the signal input from the automated driving switching switch 87. Moreover, the switch controller 150 switches from the automated driving mode to the manual driving mode based on operation instructing acceleration/deceleration or steering on configuration of the driving operation system of the HMI 70. For example, the switch controller 150 switches from the automated driving mode to the manual driving mode (overrides) when a state in which the operation amount indicated by the signal input from the configuration of the driving operation system of the HMI 70 exceeds a threshold value has continued for a reference time or longer. Note that after switching to the manual driving mode due to override, the switch controller 150 may return to the automated driving mode in cases in which operation on the configuration the driving operation system of the HMI 70 has not been detected for a specific amount of time. For example, in cases in which handover control that transitions from the automated driving mode to the manual driving mode is to be performed at the point at which the automated driving mode is expected to end, the switch controller 150 outputs information expressing this to the HMI controller 170 in order to notify handover request to the vehicle occupant in advance.

The travelling controller 160 controls the travel drive output device 200, the steering device 210, and the brake device 220 such that the vehicle M passes through the course generated by the course generation section 146 as prescribed by planned timings.

The HMI controller 170 controls the HMI 70 based on information regarding the driving mode obtained from the automated driving controller 120. Note that the HMI controller 170, and the display device 82 and speaker 83 out of the HMI 70, are examples of a "informing section". In cases in which the automated driving mode of the vehicle M transitions to any of plural modes in accordance with the travelling environment of the vehicle M, the HMI controller 170 and the HMI 70 predict the timing at which the mode will transition, and informs the predicted timing using the display device 82, the speaker 83, and the like. For example, the HMI controller 170 and the HMI 70 predict, for example, the continuation time until transition is to be made from a high state of automated driving level to a low state of automated driving level, but may also predict the continuation time until transition is to be made from a state with a low level of automated driving to a state with a high level of automated driving.

For example, the HMI controller 170 controls whether or not the vehicle occupant is permitted to operate the non-driving operation system of the HMI 70 and the interface devices such as the navigation device 50, based on the driving mode. Moreover, in cases of changing to an automated driving mode that demands a different degree of responsibility to monitor the surroundings from the vehicle occupant, or in cases of changing to an automated driving mode having a different operation permission level for the interface devices, the HMI controller 170 outputs specific information to the interface devices.

Figure 11:
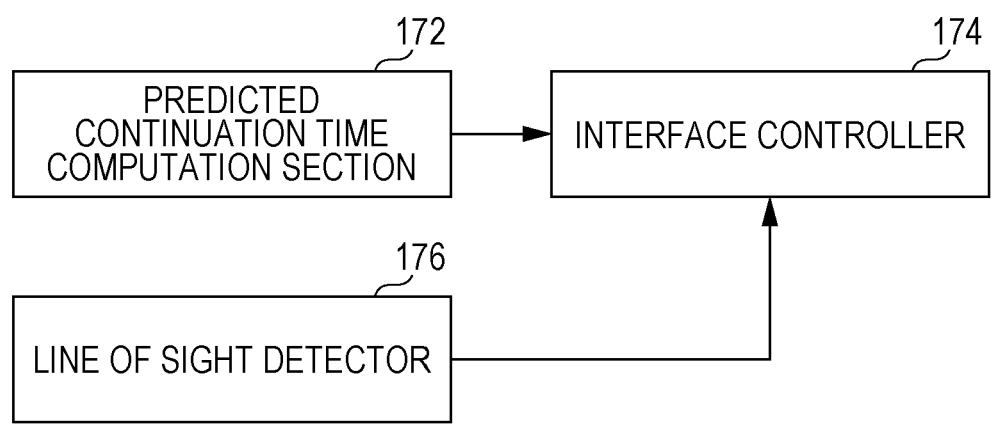
FIG. 11 is a diagram illustrating an example of a configuration of an HMI controller.

FIG. 11 is a diagram illustrating an example of configuration of the HMI controller 170. The HMI controller 170 illustrated in FIG. 11 includes a predicted continuation time computation section 172, an interface controller 174, and a line of sight detector 176.

In cases in which the automated driving mode of the vehicle M transitions to any of plural modes in accordance with the travelling environment of the vehicle M, the predicted continuation time computation section 172 predicts the timing at which the mode will transition. More specifically, in cases in which mode information acquired by the automated driving controller 120 is a driving mode needing information output, the predicted continuation time computation section 172 computes a time for which the current driving mode of the vehicle M is to continue (the predicted continuation time of the mode). Determination as to whether or not information output is needed is made, for example, in cases in which a change in the driving mode is made from the second mode to the first mode and the degree of responsibility to monitor the surroundings has been lowered or the operation permission level for the interface devices has been increased, and the like. However, there is no limitation thereto.

When the predicted continuation time of the mode is predicted, the predicted continuation time computation section 172 acquires the vehicle speed (travelling speed) of the vehicle M from the vehicle sensor 60, and requests acquisition of traffic information from an external device (for example, a management server such as a traffic management system) or the like via the communication device 55 and acquires the traffic information related to the route up to the destination that the vehicle M is travelling to. In such cases, the predicted continuation time computation section 172 may transmit, to an external device, position information of the vehicle M inferred by the GNSS receiver or the like in the vehicle M described above, and may receive traffic information regarding the surrounding region corresponding to the position information.

Figure 12:
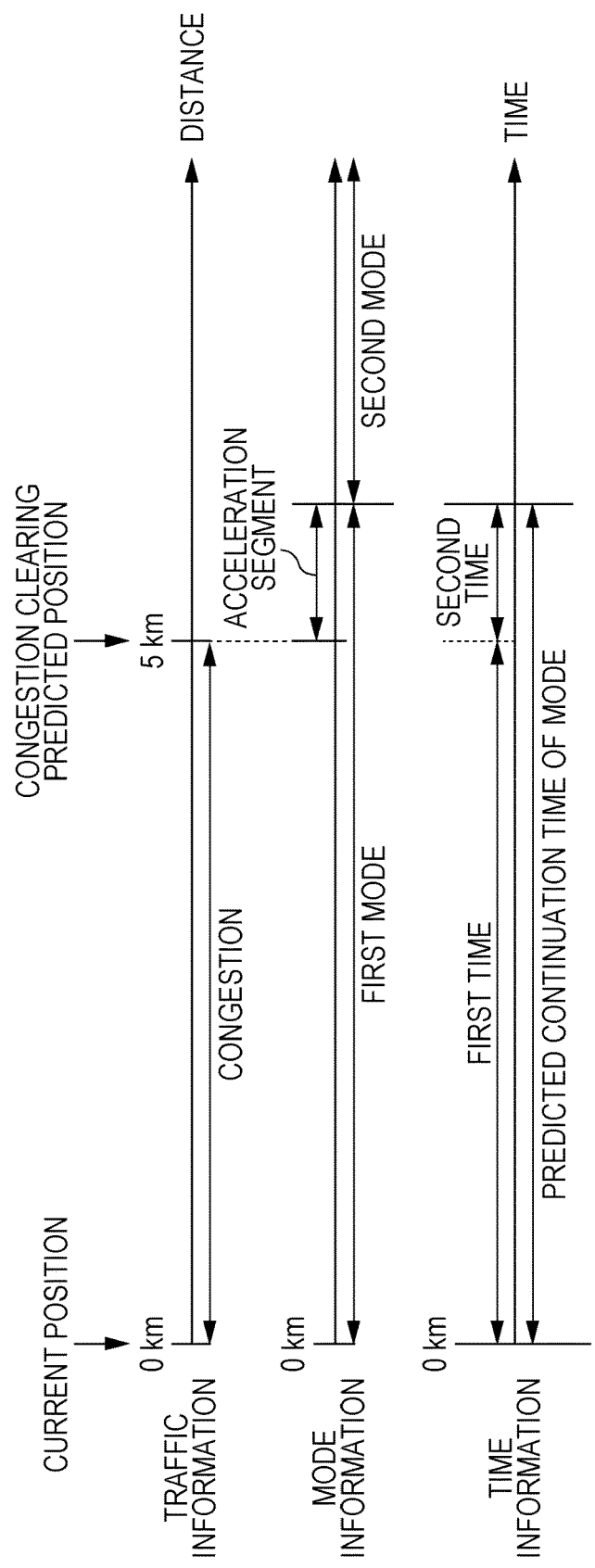
FIG. 12 is a diagram for explaining an example of computing a predicted continuation time of a mode.

Next, the predicted continuation time computation section 172 computes the predicted continuation time for the mode based on the received traffic information and the vehicle speed of the vehicle M. FIG. 12 is a diagram for explaining an example of computing the predicted continuation time of the mode. The predicted continuation time computation section 172, for example, computes the distance between the current position of the vehicle M and the position where it is predicted that congestion from the received traffic information will clear (congestion clearing prediction position) (a distance of 5 km in the example of FIG. 12), and divides the computed distance by the current vehicle speed of the vehicle M. The predicted continuation time computation section 172 thereby computes the time taken to move from the current position of the vehicle M to the position where it is predicted that the congestion will clear (the first time indicated in FIG. 12).

With reference to the congestion clearing prediction position, the predicted continuation time computation section 172 computes a time until the vehicle M accelerates from that position by a specific acceleration and reaches a specific speed for switching from the first mode to the second mode (or for releasing the TJP mode) (the second time indicated in FIG. 12). The second time is, for example, a time until reaching a specific speed at which the second mode is switched to when having accelerated by a specific acceleration from the congestion clearing prediction position, with reference to the current vehicle speed of the vehicle M. The second time corresponds to the time at which the vehicle M transitions to the acceleration segment illustrated in FIG. 12. Next, as illustrated in FIG. 12, the predicted continuation time computation section 172 adds together the first time and the second time described above to compute the predicted continuation time of the mode, and outputs the computed predicted continuation time to the interface controller 174.

Note that the computation method for the predicted continuation is not limited thereto, and, for example, the first time described above may be computed as the predicted continuation time, or the predicted continuation time may be computed by adding an adjustment time to the result of adding together the first time and the second time based on the traffic condition. The predicted continuation time computation section 172 computes the predicted continuation time of the driving mode described above at specific time intervals, and outputs the predicted continuation time of the mode obtained at the specific time intervals to the interface controller 174. An up-to-date predicted continuation time according with changes to the traffic conditions or the like may be output by predicting the predicted continuation time of the mode, at specific time intervals.

The interface controller 174 receives operations by the vehicle occupant of the vehicle while restricting operations on the interface devices of the non-driving operation system of the HMI 70 that output information, in accordance with the automated driving mode to be implemented by the automated driving controller 120. For example, the predicted continuation time of the mode predicted by the predicted continuation time computation section 172 is output to each of the interface devices inside the HMI 70. The interface controller 174, for example, outputs to the interface devices information indicating the predicted continuation time until the timing at which the automated driving mode changes to an automated driving mode with a high degree of the responsibility to monitor the surroundings of the vehicle M.

For example, the interface controller 174 may start outputting information indicating the predicted continuation time to the interface devices at a start timing of the automated driving mode preceding a change to the automated driving mode with a high degree of responsibility to monitor the surroundings of the vehicle M. The interface controller 174 may start at a timing when a change has been made from an automated driving mode with a high degree of responsibility to monitor the surroundings of the vehicle M to an automated driving mode with a low degree of responsibility to monitor the surroundings of the vehicle.

Figure 13:
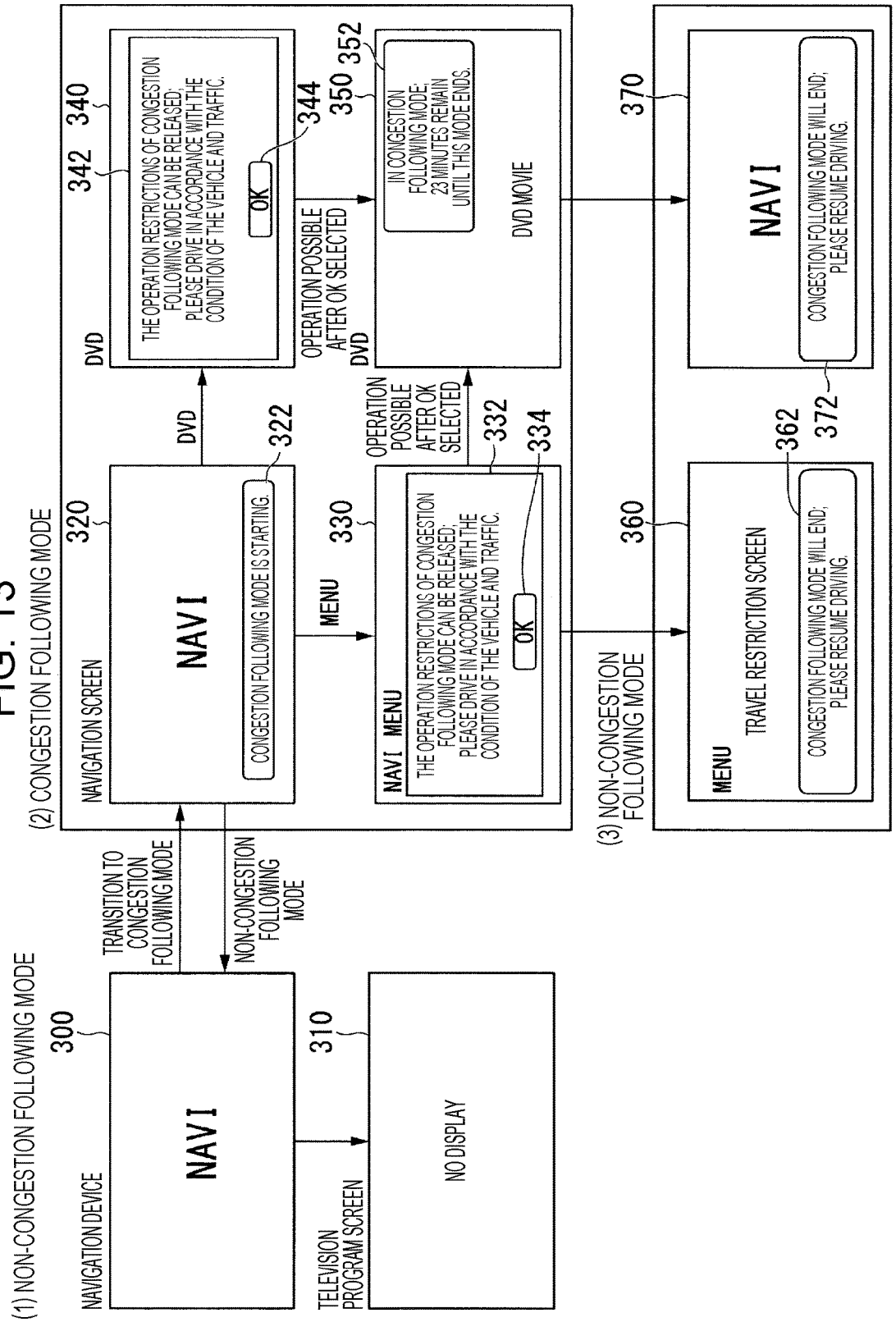
FIG. 13 is a diagram illustrating an example of information output from an interface device.

FIG. 13 is a diagram illustrating an example of information output from the interface devices. In the example of FIG. 13, explanation is given in which congestion following mode (TJP mode) is employed as the example of the first mode described above, and non-congestion following mode (TJP released mode) is employed as the example of the second mode described above.

In the example of FIG. 13, in cases in which the vehicle M is in a non-congestion following mode (the case of "(1) non-congestion following mode" illustrated in FIG. 13), specific operations on the interface devices are restricted since responsibility to monitor the surroundings is entrusted to the vehicle occupant of the vehicle M. Accordingly, as illustrated in FIG. 13, although a navigation screen 300 can be displayed, a screen 310 for displaying television programs is not displayed.

Here, in cases in which transition is made from a non-congestion following mode to the congestion following mode (the case of "(2) congestion following mode" illustrated in FIG. 13) by automated driving of the vehicle M as illustrated in FIG. 13, a navigation screen 320 displays a screen for route guidance, but a message screen 322 stating that congestion following mode is starting is also displayed in such a case.

In cases in which a shift is made from the navigation screen 320 to a menu screen 330, the vehicle occupant can be notified to arouse caution or the like by displaying a message screen 332 such as "the operation restrictions of congestion following mode can be released; please drive in accordance with the condition of the vehicle and traffic" and an OK button 334. Note that the content of the message is not limited thereto. The interface controller 174 releases the operation restriction upon receiving that the OK button 334 was selected by the vehicle occupant, and can operate the navigation device 50 to transition to the DVD screen or the like.

Similarly, in cases in which a shift has been made from the navigation screen 320 to a DVD screen 340 due to DVD operation, the vehicle occupant can be notified to arouse caution or the like by displaying a message screen 342 and an OK button 344 as described above. The interface controller 174 can release the operation restriction and operate the navigation device 50 to transition to the DVD screen or the like, by receiving the selection of the OK button 344 by the vehicle occupant.

Here, the interface controller 174 displays a message 352 including information indicating that the congestion following mode is ongoing (mode information) and information related to the predicted continuation time of the current mode on a DVD movie display screen 350 that was transitioned to. In the example of FIG. 13, in cases in which the predicted continuation time of the mode is 23 minutes, information such as "congestion following mode is ongoing; 23 minutes remaining until this mode ends" can be displayed superimposed on the DVD movie as the message 352.

Note that since a portion of the DVD movie is sometimes hidden by superimposed display of the message 352, the interface controller 174 may provide a different region that does not overlap with the display region of the DVD movie and may display in that region, or the message 352 may be displayed semi-transparently. Moreover, the interface controller 174 may dismiss the message after displaying the message 352 for several seconds. Information regarding the predicted continuation time included in the message 352 may be updated and displayed at specific time intervals. This enables the vehicle occupant to have time to prepare for a switch in automated driving and enables the vehicle occupant to relax and watch a DVD movie until that time, since the vehicle occupant can ascertain the predicted time until the degree of the responsibility to monitor the surroundings will be increased due to a mode change.

In cases in which responsibility to monitor the surroundings has arisen in the vehicle due to a mode change from the congestion following mode (the case of "(3) non-congestion following mode" illustrated in FIG. 13), the menu screen 330 shifts to a travel restriction screen 360 and displays a message 362 stating that travel restrictions are to be imposed. A message such as "congestion following mode will end; please resume driving" as illustrated in FIG. 13 is an example of the message, and is displayed before the vehicle occupant is to drive the vehicle M (for example, at a timing at which preparation for handover is prompted). Similarly, when transitioning from the DVD movie display screen 350, a navigation screen 370 is displayed and a similar message 372 is displayed at a specific timing in accordance with the state of the vehicle occupant. The messages 362 and 372 may be displayed for the specific time interval alone, or may be displayed until the mode switches. The contents of the messages are not limited to the examples described above. Each message illustrated in FIG. 13 may be displayed on screen and also output as audio, or may be output as audio alone.

As illustrated in FIG. 13, a informing section that includes a portion of the HMI 70 and the HMI controller 170 informs the predicted continuation time of the congestion following travel mode that performs automated driving to follow the vehicle in front at a specific speed or below. For example, the informing section can predict a timing at which transition will be made, from the congestion following travel mode that performs automated driving to follow the vehicle ahead at a specific speed or below, to an ordinary travel mode that performs ordinary automated driving to follow a specific action plan, can compute the predicted continuation time of the congestion following travel mode based on the result of the prediction, and can inform the computed predicted continuation time. The informing section changes the presence/absence or condition of output of specific information based on the usage states of the interface devices. The vehicle occupant can thereby acquire appropriate information regarding switching of the driving mode from the interface devices or the like. The vehicle occupant is caused to recognize the switching timing of the automated driving due to the interface devices outputting information as described above, enabling the vehicle occupant to make more efficient usage of time.

The interface controller 174 also performs operation permission control related to the HMI 70 or the navigation device 50 based on the mode information obtained from the automated driving controller 120. For example, in the case of the vehicle M being in the manual driving mode, the vehicle occupant operates the driving operation system (for example, the accelerator pedal 71, the brake pedal 74, the shift lever 76, the steering wheel 78, and the like) of the HMI 70. In the case of the second mode, the third mode, or the like of the automated driving mode, a responsibility to monitor the surroundings arises for the vehicle occupant in the vehicle M. In such cases, in order to prevent the attention of the vehicle occupant from being distracted by actions (such as operations) other than driving (driver distractions), the interface controller 174 controls such that operations on a portion or all of the non-driving operation system of the HMI 70 are not received.

In cases in which the driving mode has transitioned from the second mode to the first mode of automated driving, the interface controller 174 eases the driver distraction restrictions and performs control to receive operations by the vehicle occupant on the non-driving operation system that had not been receiving operations. For example, the interface controller 174 determines the permissions for operations related to the HMI 70 or the navigation device 50 based on the mode information obtained from the automated driving controller 120 and the per-mode operation permission information 188 stored in the storage section 180.

FIG. 14 is a diagram illustrating an example of the per-mode operation permission information 188. The per-mode operation permission information 188 illustrated in FIG. 14 includes "manual driving mode" and "automated driving mode" as driving mode items. The per-mode operation permission information 188 includes the "first mode", the "second mode", the "third mode", and the like described above as the "automated driving mode". The per-mode operation permission information 188 also includes "navigation operation", which is an operation on the navigation device 50, "content playback operation", which is an operation on the content playback device 85, "instrument panel operation", which is an operation on the display device 82, and the like, as items of the non-driving operation system. In the example of the per-mode operation permission information 188 illustrated in FIG. 14, permissions are set for operations by the vehicle occupant on the non-driving operation system for each of the driving modes described above; however, the target interface devices are not limited thereto.

The interface controller 174 determines the interface devices (respective operation systems) for which usage is permitted and the interface devices for which usage is not permitted by referencing the per-mode operation permission information 188 based on the mode information (driving mode) acquired from the automated driving controller 120. The interface controller 174 also controls permissions for receiving operations from the vehicle occupant on the interface devices of the non-driving operation system based on the determination result.

Figure 15:
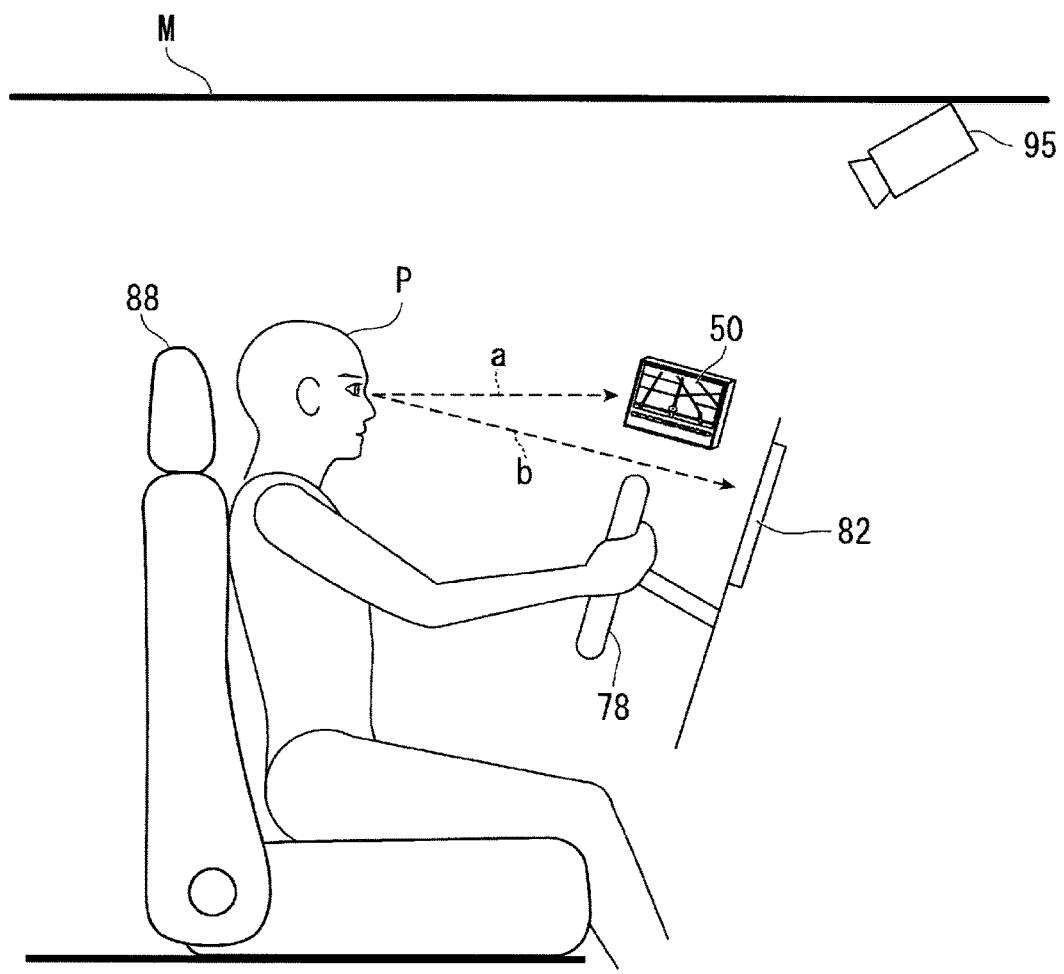
FIG. 15 is a diagram for explaining content of vehicle occupant line of sight detection by a vehicle.

The interface controller 174 may also select and display the target interface devices (HMIs 70) to which to output information based on the vehicle occupant line of sight detection result obtained by the line of sight detector 176. FIG. 15 is a diagram for explaining content of the vehicle occupant line of sight detection of the vehicle M.

In the example of FIG. 15, an in-cabin camera 95 capable of imaging the head (face) of a vehicle occupant P is provided inside the vehicle M. Note that in the example of FIG. 15, a state is illustrated in which the vehicle occupant P is seated in the seat 88 and gripping the steering wheel 78, and is driving manually. In the example of FIG. 15, the navigation device 50 and the display device 82 are illustrated as examples of the interface devices of the HMI 70.

The line of sight detector 176 detects, for example, the position of the inner canthi and the position of the irises of the vehicle occupant based on feature information such as the brightness and shapes in the images captured by the in-cabin camera 95 of the HMI 70. The line of sight detector 176 detects the line of sight direction from the positional relationship between the detected corner or the eye and iris. Note that the line of sight detection method is not limited to the example described above. The line of sight detector 176 also infers the interface devices that are in the detected line of sight direction of the vehicle occupant P.

For example, in cases in which the capture range (image angle) of the in-cabin camera 95 is fixed, the line of sight detector 176 infers the position in the image of each interface device, such as the navigation device 50 and the display device 82, in the captured image. Accordingly, the interface devices being looked at by the vehicle occupant P can be inferred based on the position information of the line of sight direction target in the image.

For example, in the example of FIG. 15, the line of sight direction of the vehicle occupant P is detected from the captured image captured by the in-cabin camera 95, and the line of sight detector 176 infers that the vehicle occupant P is looking at the navigation device 50 when the detected line of sight direction is the arrow a. When the line of sight direction is the arrow b, the line of sight detector 176 infers that, for example, a display device 82, such as the instrument panel, is being viewed. The line of sight detector 176 outputs the information regarding the interface devices in the inferred line of sight direction to the interface controller 174.

The interface controller 174 can output information including the continuation time of the current mode of automated driving described above to the interface devices in the line of sight direction of vehicle occupant P obtained from the line of sight detector 176. This enables the processing load to be reduced compared to when display is made on all interface devices, and enables the vehicle occupant P to be more reliably caused to recognize information related to changes in the driving mode of automated driving (the predicted continuation time of the mode) and the like.

Processing Flow

Explanation follows regarding a flow of processing by the vehicle control system 100 according to the present embodiment. Note that in the following explanation, out of each type of processing in the vehicle control system 100, explanation follows mostly regarding the flow of HMI control processing related to information output accompanying an automated driving mode change implemented by the HMI controller 170.

First Embodiment

Figure 16:
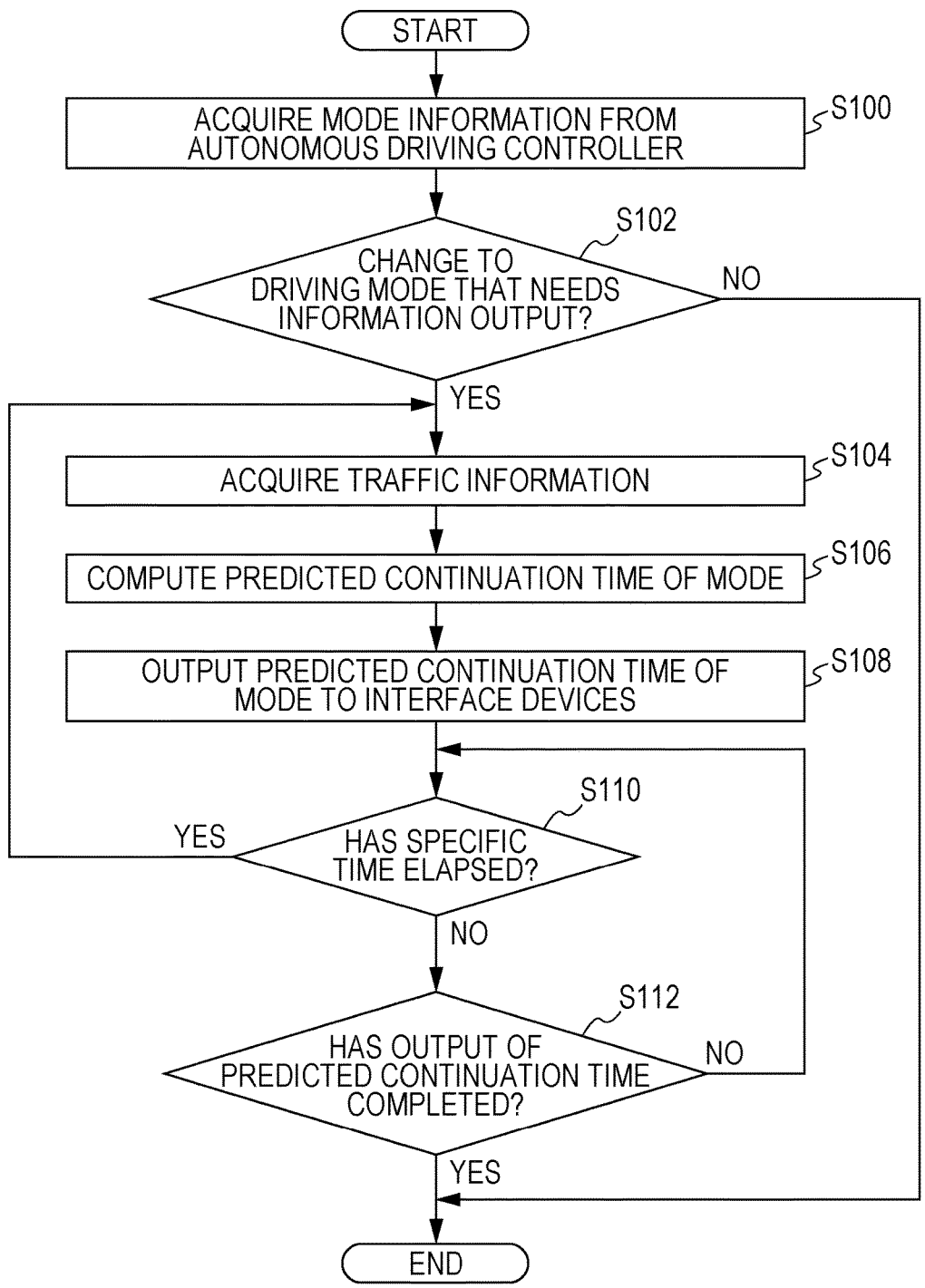
FIG. 16 is a flowchart illustrating a first embodiment of HMI control processing.

FIG. 16 is a flowchart illustrating a first embodiment of HMI control processing. In the example of FIG. 16, the HMI controller 170 acquires the mode information from the automated driving controller 120 (step S100). Next, the predicted continuation time computation section 172 determines whether or not a change from the current driving mode to the driving mode included in the acquired mode information is a change that requires information output (step S102). A driving mode requiring output of information is, for example, a drive mode that lowers the degree of responsibility to monitor the surroundings of the vehicle occupant, or a drive mode that increases the operation permission level of the interface devices. One example thereof corresponds to a change from the second mode to the first mode, a change from the TJP released mode to the TJP mode, or the like; however, there is no limitation thereto.

In cases in which output of information is needed, the predicted continuation time computation section 172 acquires traffic information (step S104), and computes the predicted continuation time of the mode (step S106). Note that details of the computation processing for the predicted continuation time of the mode are described later.

Next, the interface controller 174 outputs the computed predicted continuation time of the mode to each of the interface devices of the HMI 70 inside the vehicle M (step S108). Next, the interface controller 174 determines whether or not a specific time (for example, from 1 minute to 3 minutes) has elapsed since the predicted continuation time of the mode was output (step S110). In cases in which the specific time has elapsed, processing returns to step S104, and up-to-date traffic information is acquired and the predicted continuation time is computed. The up-to-date predicted continuation time can thereby be displayed to the vehicle occupant at specific time intervals.

In cases in which the specific time has not elapsed, the interface controller 174 determines whether or not output of the predicted continuation time has completed (step S112). In the processing of step S112, the interface controller 174 ends output of the predicted continuation time in cases in which control that switches the driving mode of the vehicle M has been implemented, and in cases in which an end instruction from the controlled-vehicle occupant; however, there is no limitation thereto.

In cases in which output of the predicted continuation time has not finished, the interface controller 174 returns processing to step S110. In cases in which output of the predicted continuation time has finished, the interface controller 174 reaches the end the current flowchart. In the processing of step S102 described above, the interface controller 174 reaches the end of the current flowchart in cases in which the driving mode change does not require output of information.

Computation Processing for Predicted Continuation Time of Mode (Step S106)

Figure 17:
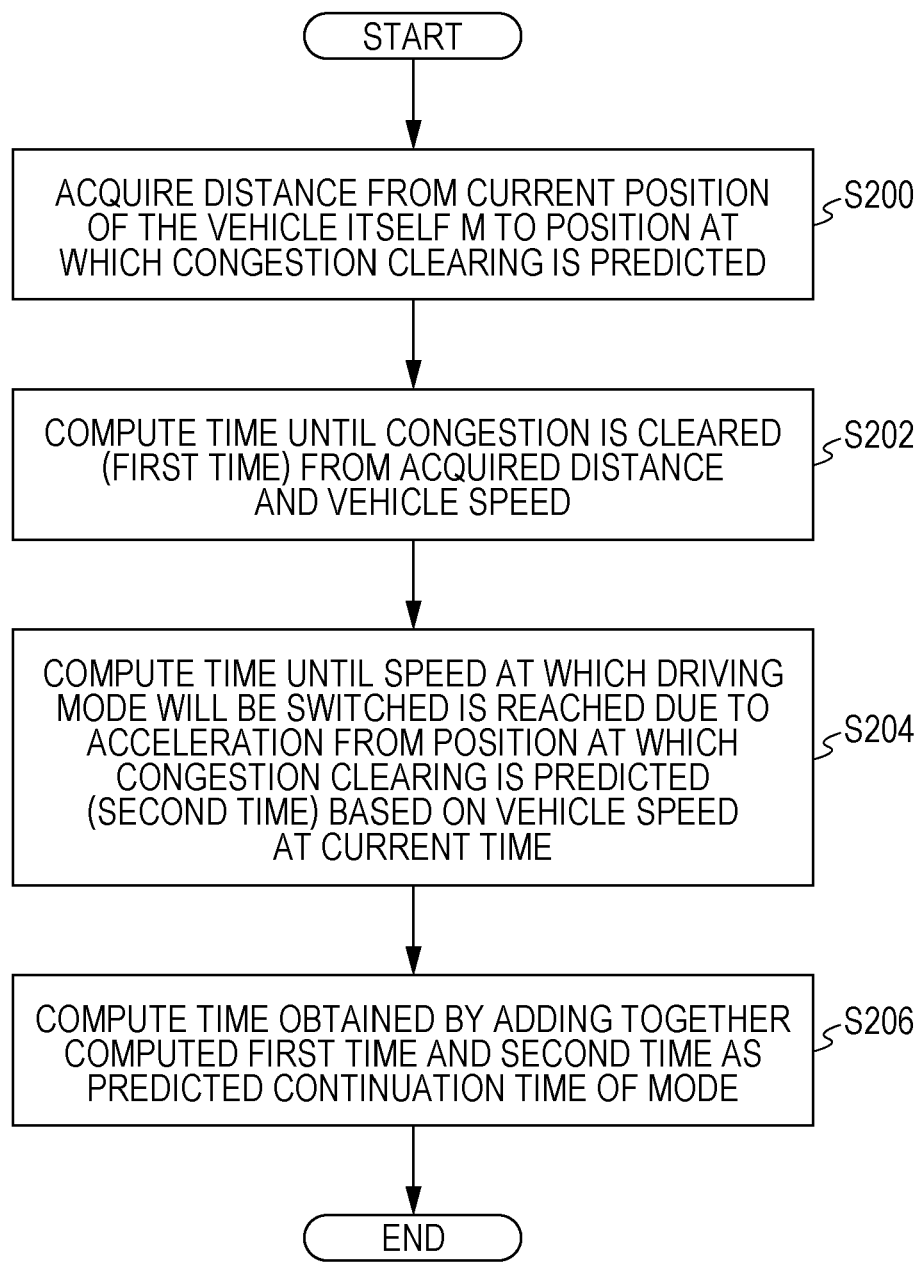
FIG. 17 is a flowchart illustrating an example of computation processing for a predicted continuation time of a mode.

Next, explanation follows regarding an example of the computation processing for the predicted continuation time of the mode at step S106 described above, with reference to a flowchart. FIG. 17 is a flowchart illustrating an example of the computation processing for the predicted continuation time of the mode. In the example of FIG. 17, the predicted continuation time computation section 172 acquires the distance from the current position of the vehicle M to the position at which the congestion is predicted to clear (step S200). In the processing of step S200, for example, on the route to the destination set by the vehicle occupant using the navigation device 50, a distance is acquired along a route between the current position of the vehicle M inferred from the GNSS receiver and a position at which the congestion is predicted to clear obtained from traffic information related to the set route. For example, if the traffic information includes congestion information of "congestion at junction x", "congestion at toll booth y", or the like, the position at which the congestion is predicted to clear is the position of the junction x or the toll booth y, and this position information can be acquired from, for example, the high precision map information 182.

Next, the predicted continuation time computation section 172 computes the time until the congestion clears (the first time) from the acquired distance and the vehicle speed of the vehicle M (step S202). Note that in cases in which the vehicle M is stopped in congestion or the like at the current time (cases in which the vehicle speed is 0 km/h), the first time described above may be computed using the average vehicle speed over a specific time interval (for example, from approximately 3 minutes to approximately 30 minutes) up to that time. The first time can be acquired by, for example, dividing the distance by the vehicle speed.

Next, the predicted continuation time computation section 172 computes the time until a vehicle speed at which the driving mode is switched will be reached (the second time) from the acceleration from the position at which the congestion was predicted to clear, based on the vehicle speed at the current position (or the average vehicle speed as described above) (step S204). Note that the acceleration described above is an acceleration based on the acceleration amount per preset unit of time; however, there is no limitation thereto, and the acceleration amount may be set so as to gradually increase. Next, the predicted continuation time computation section 172 computes the time obtained by adding together the first time and the second time described above as the predicted continuation time of the mode (step S206).

Second Embodiment

Figure 18:
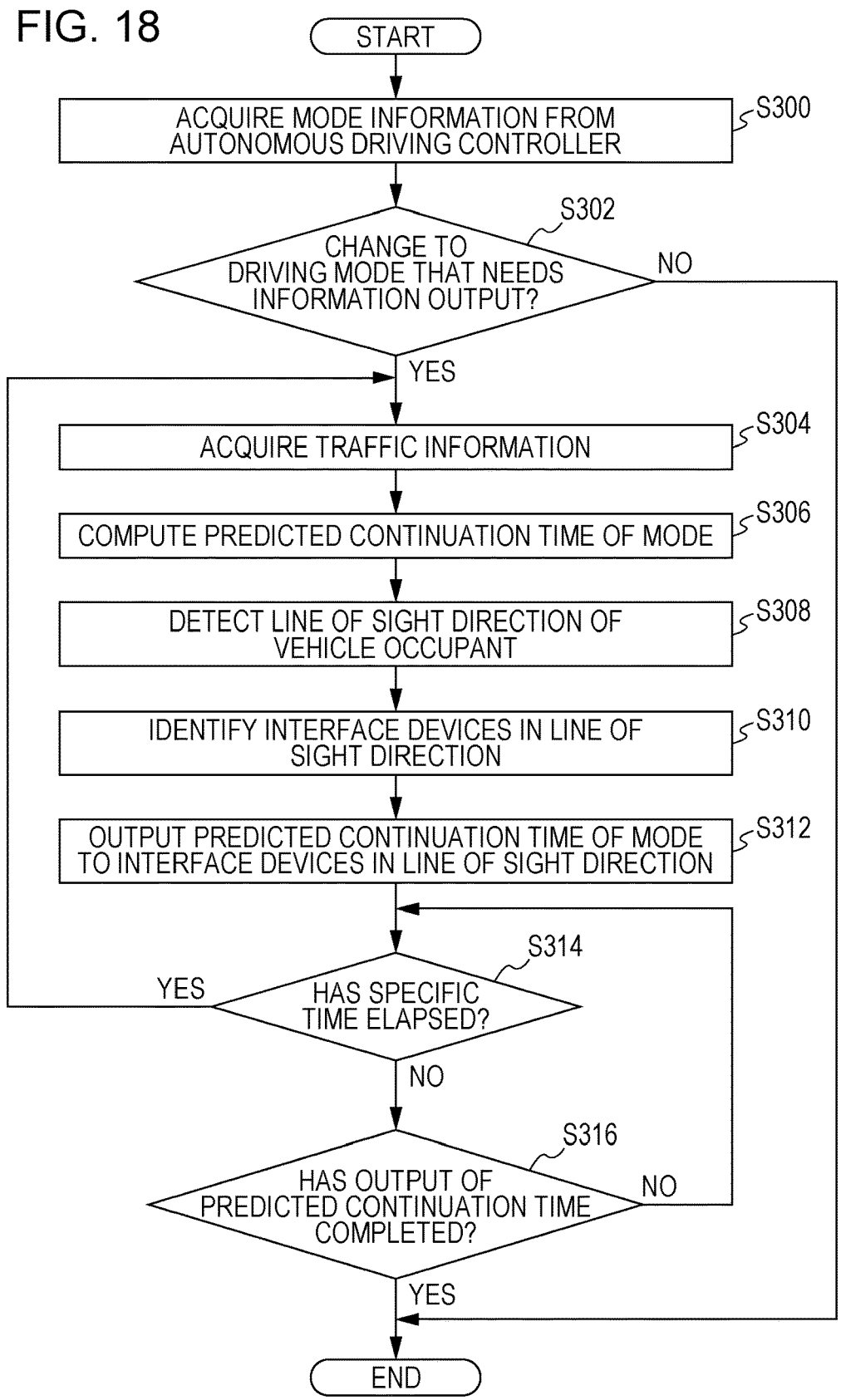
FIG. 18 is a flowchart illustrating a second embodiment of HMI control processing.

FIG. 18 is a flowchart illustrating a second example of the HMI control processing. In the example of FIG. 18, the processing of steps S300 to S306 is similar to the processing of steps S100 to S106 of the first embodiment described above, and specific explanation thereof is therefore omitted here.

After computing the predicted continuation time of the mode in the processing of step S306, the line of sight detector 176 detects the line of sight of the vehicle occupant using the image captured from the in-cabin camera 95 or the like (step S308) to identify the interface devices of the HMI 70 that are in the detected line of sight direction (step S310).

Next, the interface controller 174 outputs the computed predicted continuation time of the mode to the interface devices identified to be in the line of sight direction (step S312). Next, the interface controller 174 determines whether or not the specific time (for example, from 1 minute to 3 minutes) has elapsed since the predicted continuation time of the mode was output (step S314). In cases in which the specific time has elapsed, processing returns to step S304, up-to-date traffic information is acquired to compute the predicted continuation time and the line of sight direction of the vehicle occupant at that point in time is detected, and the interface devices in the detected line of sight direction are identified. This enables an up-to-date predicted continuation time to be displayed at specific time intervals, and also enables the vehicle occupant to more reliably ascertain the predicted continuation time of the mode since the display is on the interface devices that are in the vehicle occupant line of sight direction.

When the specific time has not elapsed, the interface controller 174 determines whether or not output of the predicted continuation time has finished (step S316). In the processing of step S316, the interface controller 174 ends output of the predicted continuation time in cases in which control that switches the driving mode of the vehicle M has been implemented, and in cases in which an end instruction has been issued from the controlled-vehicle occupant; however, there is no limitation thereto.

In cases in which output of the predicted continuation time has not finished, the interface controller 174 returns processing to step S314. In cases in which output of the predicted continuation time has finished, the interface controller 174 reaches the end of the current flowchart. In the processing of step S302 described above, the interface controller 174 reaches the end of the current flowchart in cases in which the driving mode change does not require output of information. Note that the HMI control processing illustrated in FIG. 16 and FIG. 18 may be executed at the point in time when the mode information is acquired by the automated driving controller 120, or may be implemented at specific time intervals. Moreover, a portion or all of the respective embodiments described above may be combined to give an embodiment.

According to the embodiments described above, the vehicle control system 100 outputs to the interface devices information indicating a predicted continuation time until a timing at which the automated driving mode changes to an automated driving mode with a high degree of responsibility to monitor the surroundings of the vehicle, or a timing at which the automated driving mode changes to a low automated driving mode of operation permission level for the interface devices, and thereby enables the vehicle occupant to be caused to recognize the timing at which the automated driving switches, and enables the vehicle occupant to use their time more efficiently. Outputting, until the timing at which the mode changes, the predicted continuation time to the interface devices can reduce the unease of the vehicle occupant in automated driving since the state of the automated driving mode is ascertainable.

Although explanation has been given regarding modes for implementing the present disclosure with reference to embodiments, the present disclosure is not limited to these embodiments in any way, and various, additional modifications and substitutions can be made within a range that does not depart from the spirit of the present disclosure.

What is claimed is:

1. A vehicle control system comprising:
   an automated driving controller configured to
      automatically control at least one out of acceleration, deceleration, and steering of a vehicle,
      perform automated driving control in one mode of a plurality of predetermined different modes which require different levels of automated driving, which comprise a first mode and a second mode, the first mode requiring a lower degree of a responsibility for a driver to monitor surroundings of the vehicle and allowing a higher permission level of a non-driving operation as compared with the second mode, and
      transition the first mode to the second mode among the plurality of predetermined different modes in accordance with a travel environment of the vehicle; and
   an informing section configured to predict a timing at which the mode of the automated driving will transition from the first mode to the second mode and to inform a driver in the vehicle of a predicted period of continuation time of the second mode when the second mode is started, based on the predicted timing of transitioning from the first mode to the second mode,
   wherein the informing section comprises a predicted period of continuation time calculation section that calculates the predicted period of continuation time based on a current position of the vehicle and traffic information related to a route to a destination the vehicle is travelling to,
   wherein the informing section informs the driver of the predicted period of continuation time calculated by the predicted continuation time calculation section, and
   wherein the predicted continuation time calculation section
      calculates a distance on a route of travel by the vehicle based on the current position of the vehicle and a position at which the congestion is predicted to end obtained from the traffic information, and calculates a first period of time based on the calculated distance and the vehicle speed of the vehicle,
      calculates a second period of time for the vehicle to reach a predetermined speed by acceleration of the vehicle at a predetermined acceleration from the position at which the congestion is predicted to end, and
      calculates the predicted period of continuation time based on the calculated first period of time and the calculated second period of time.

2. The vehicle control system according to claim 1, wherein the informing section detects that the first mode is a congestion travel mode of the automated driving for the vehicle to follow another vehicle in front at a predetermined speed or less and informs the driver of a predicted period of time during which the automated driving in the first mode continues.

3. The vehicle control system according to claim 1, wherein the predicted continuation time calculation section calculates the predicted period of continuation time at specific time intervals.

4. The vehicle control system according to claim 1, further comprising:
a sight-direction detector that detects a line of sight direction of a driver in the vehicle, wherein
the informing section informs the driver of a timing of the transitioning of the mode with an interface device present in the line of sight direction of the driver detected by the sight-direction detector.

5. A vehicle control system comprising:
an automated driving controller configured to
automatically control at least one out of acceleration, deceleration, and steering of a vehicle,
perform automated driving control in one mode of a plurality of predetermined different modes which requires different levels of automated driving, and
transition a first mode to a second mode among the plurality of predetermined different modes in accordance with a travel environment of the vehicle; and
an informing section configured to predict a timing at which the mode of the automated driving will transition from the first mode to the second mode and to inform a driver in the vehicle of the predicted timing,
wherein the informing section detects that the level of the automated driving in the second mode is higher than the level of the automated driving in the first mode, and alerts the driver to a predicted period of continuation time from a current time in the first mode to the timing of the transitioning to the second mode with the higher level,
wherein the informing section comprises a predicted period of continuation time calculation section that calculates the predicted period of continuation time based on a current position of the vehicle and traffic information related to a route to a destination the vehicle is travelling to,
wherein the informing section informs the driver of the predicted period of continuation time calculated by the predicted continuation time calculation section, and
wherein the predicted continuation time calculation section
calculates a distance on a route of travel by the vehicle based on the current position of the vehicle and a position at which the congestion is predicted to end obtained from the traffic information, and calculates a first period of time based on the calculated distance and the vehicle speed of the vehicle,
calculates a second period of time for the vehicle to reach a predetermined speed by acceleration of the vehicle at a predetermined acceleration from the position at which the congestion is predicted to end, and
calculates the predicted period of continuation time based on the calculated first period of time and the calculated second period of time.

6. A vehicle control method performed by an onboard computer, the vehicle control method comprising:
automatically controlling at least one out of acceleration, deceleration, and steering of a vehicle;
performing automated driving control in one of a plurality of predetermined different modes which require different levels of automated driving, which comprise a first mode and a second mode, the first mode requiring a lower degree of a responsibility for a driver to monitor surroundings of the vehicle and allowing a higher permission level of a non-driving operation as compared with the second mode;
transitioning a first mode to a second mode among the plurality of predetermined different modes in accordance with a travel environment of the vehicle;
predicting a timing at which the mode of the automated driving will transition from the first mode to the second mode; and
informing a driver in the vehicle of a predicted period of continuation time of the second mode when the second mode is started, based on the predicted timing of transitioning from the first mode to the second mode,
wherein the predicting step comprises calculating the predicted period of continuation time based on a current position of the vehicle and traffic information related to a route to a destination the vehicle is travelling to,
wherein the informing step comprises informing the driver of the predicted period of continuation time, and
wherein, in the predicting step, the predicted period of continuation time is obtained by
calculating a distance on a route of travel by the vehicle based on the current position of the vehicle and a position at which the congestion is predicted to end obtained from the traffic information, and calculates a first period of time based on the calculated distance and the vehicle speed of the vehicle,
calculating a second period of time for the vehicle to reach a predetermined speed by acceleration of the vehicle at a predetermined acceleration from the position at which the congestion is predicted to end, and
calculating the predicted period of continuation time based on the calculated first period of time and the calculated second period of time.

7. A vehicle control program that causes an onboard computer to execute the following steps:
automatically controlling at least one out of acceleration, deceleration, and steering of a vehicle;
performing automated driving control in one of a plurality of predetermined different modes which require different levels of automated driving which comprise a first mode and a second mode, the first mode requiring a lower degree of a responsibility for a driver to monitor surroundings of the vehicle and allowing a higher permission level of a non-driving operation as compared with the second mode;
transitioning a first mode to a second mode among the plurality of predetermined different modes in accordance with a travel environment of the vehicle;
predicting a timing at which the mode of the automated driving will transition from the first mode to the second mode; and
informing a driver in the vehicle of a predicted period of continuation time of the second mode when the second mode is started, based on the predicted timing of transitioning from the first mode to the second mode,
wherein the predicting step comprises calculating the predicted period of continuation time based on a current position of the vehicle and traffic information related to a route to a destination the vehicle is travelling to, wherein the informing step comprises informing the driver of the predicted period of continuation time, and wherein, in the predicting step, the predicted period of continuation time is obtained by calculating a distance on a route of travel by the vehicle based on the current position of the vehicle and a position at which the congestion is predicted to end obtained from the traffic information, and calculates a first period of time based on the calculated distance and the vehicle speed of the vehicle, calculating a second period of time for the vehicle to reach a predetermined speed by acceleration of the vehicle at a predetermined acceleration from the position at which the congestion is predicted to end, and calculating the predicted period of continuation time based on the calculated first period of time and the calculated second period of time.

\* \* \* \* \*